(12) United States Patent
Iwamura et al.

(10) Patent No.: US 11,971,199 B2
(45) Date of Patent: Apr. 30, 2024

(54) HEAT GENERATING DEVICE AND METHOD FOR GENERATING HEAT

(71) Applicant: CLEAN PLANET Inc., Tokyo (JP)

(72) Inventors: Yasuhiro Iwamura, Sendai (JP); Takehiko Ito, Tokyo (JP); Jirota Kasagi, Sendai (JP); Hideki Yoshino, Tokyo (JP); Masanao Hattori, Tokyo (JP)

(73) Assignee: CLEAN PLANET INC., Tokyo (JP)

( * ) Notice: Subject to any disclaimer, the term of this patent is extended or adjusted under 35 U.S.C. 154(b) by 1170 days.

(21) Appl. No.: 16/622,420

(22) PCT Filed: Jun. 7, 2018

(86) PCT No.: PCT/JP2018/021933
§ 371 (c)(1),
(2) Date: Dec. 13, 2019

(87) PCT Pub. No.: WO2018/230447
PCT Pub. Date: Dec. 20, 2018

(65) Prior Publication Data
US 2020/0208885 A1 Jul. 2, 2020

(30) Foreign Application Priority Data

Jun. 15, 2017 (JP) .................................. 2017-117917

(51) Int. Cl.
*F24V 30/00* (2018.01)
*C01B 3/00* (2006.01)
(Continued)

(52) U.S. Cl.
CPC ............ *F25B 17/12* (2013.01); *C01B 3/0078* (2013.01); *F01K 3/188* (2013.01); *F24V 30/00* (2018.05);
(Continued)

(58) Field of Classification Search
None
See application file for complete search history.

(56) References Cited

U.S. PATENT DOCUMENTS 2,546,983 A * 4/1951 Enzo ..................... A47J 41/005
338/237
6,337,146 B1 1/2002 Sogabe
(Continued)

FOREIGN PATENT DOCUMENTS

JP 2000042388 A * 2/2000
JP 2001042950 A 2/2001
(Continued)

OTHER PUBLICATIONS

Translation of JP-2000042388-A (Year: 2000).*
(Continued)

*Primary Examiner* — Elizabeth M Kerr
(74) *Attorney, Agent, or Firm* — Muncy, Geissler, Olds & Lowe, P.C.

(57) ABSTRACT

A heat generating device includes a container, a heat generating element, and a heater. A hydrogen-based gas contributing to heat generation is introduced into the container. The heat generating element is provided inside the container. The heater is configured to heat the heat generating element. The heat generating element includes a base made of a hydrogen storage metal, a hydrogen storage alloy, or a proton conductor, and a multilayer film provided on a surface of the base. The multilayer film having a stacking configuration of: a first layer that is made of a hydrogen storage metal or a hydrogen storage alloy, and a second layer that is made of a hydrogen storage metal, a hydrogen storage alloy, or ceramics different from that of the first layer. The first layer and the second layer have a layer shape with a thickness of less than 1000 nm.

4 Claims, 26 Drawing Sheets

(51) Int. Cl.
*F01K 3/18* (2006.01)
*F25B 17/12* (2006.01)
*F25B 30/04* (2006.01)

(52) U.S. Cl.
CPC ...... *F25B 30/04* (2013.01); *C01B 2203/0844* (2013.01)

(56) References Cited

U.S. PATENT DOCUMENTS

| | | | |
|---|---|---|---|
| 2002/0073617 | A1 | 6/2002 | Ovshinsky et al. |
| 2004/0110023 | A1 | 6/2004 | Towata |
| 2006/0059953 | A1* | 3/2006 | Heung ............... B01D 69/00 65/440 |
| 2008/0166573 | A1* | 7/2008 | Shinozawa ........... C01B 3/0026 428/457 |
| 2012/0171461 | A1 | 7/2012 | Uchiyama |
| 2013/0028791 | A1 | 1/2013 | Uchiyama |
| 2013/0210618 | A1 | 8/2013 | Mitlin |
| 2013/0295512 | A1 | 11/2013 | Miley et al. |
| 2016/0155518 | A1 | 6/2016 | Mizuno |

FOREIGN PATENT DOCUMENTS

| | | |
|---|---|---|
| JP | 2001-289396 A | 10/2001 |
| JP | 2004025012 A | 1/2004 |
| JP | 2004053208 A | 2/2004 |
| JP | 2004066653 A | 3/2004 |
| JP | 2004077200 A | 3/2004 |
| JP | 2004083966 A | 3/2004 |
| JP | 2008531445 A | 8/2008 |
| JP | 2011219841 A | 11/2011 |
| WO | 0077266 A1 | 12/2000 |
| WO | 2011027462 A1 | 3/2011 |
| WO | 2012021996 A1 | 2/2012 |
| WO | 2015008859 A2 | 1/2015 |

OTHER PUBLICATIONS

The office action for the corresponding KR application No. 10-2020-7000694 dated May 17, 2021.
The extended European search report of the corresponding EP application No. 18818697.7 dated Nov. 27, 2020.
The written opinion for BR112019026407-8 dated Jan. 5, 2021 and partial English translation thereof.
A. Kitamura., "Brief summary of latest experimental results with a mass-flow calorimetry system for anomalous heat effect of nano-composite metals under D(H)-gas charging", Current Science, (20150000), vol. 108, No. 4, pp. 589-593.

* cited by examiner

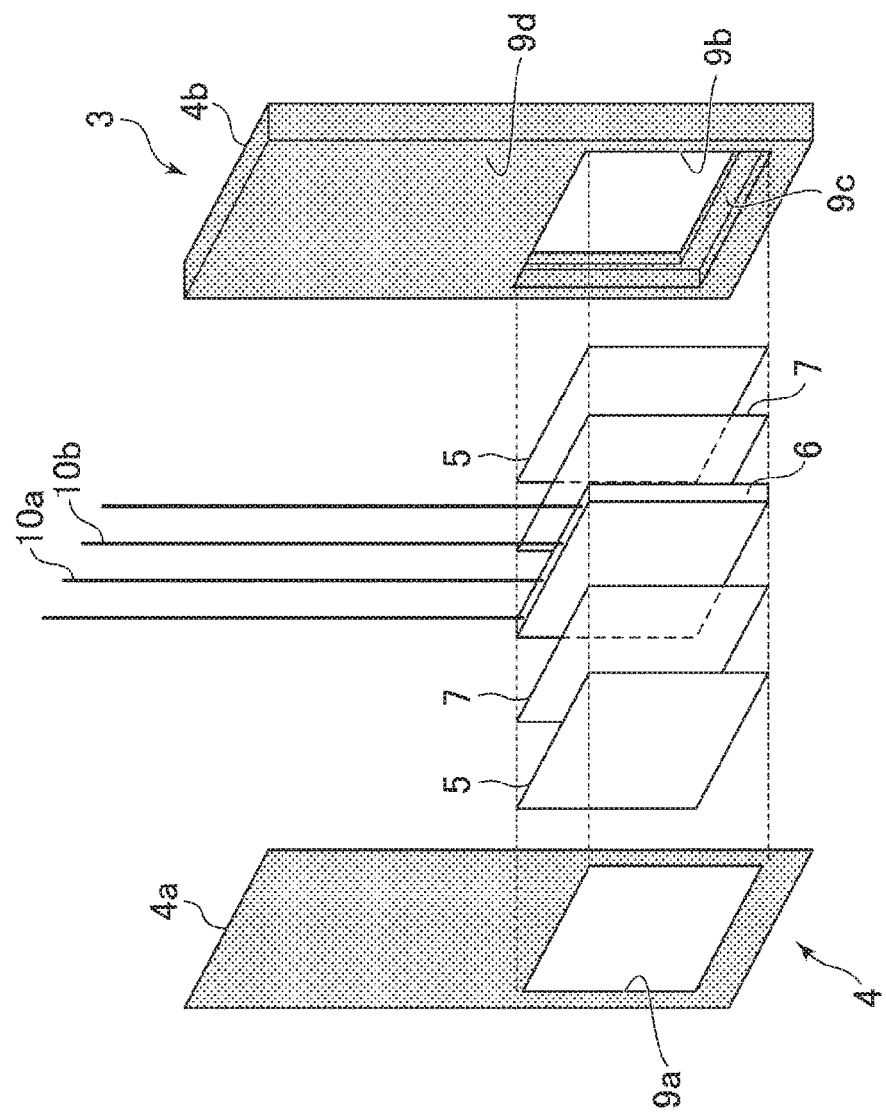

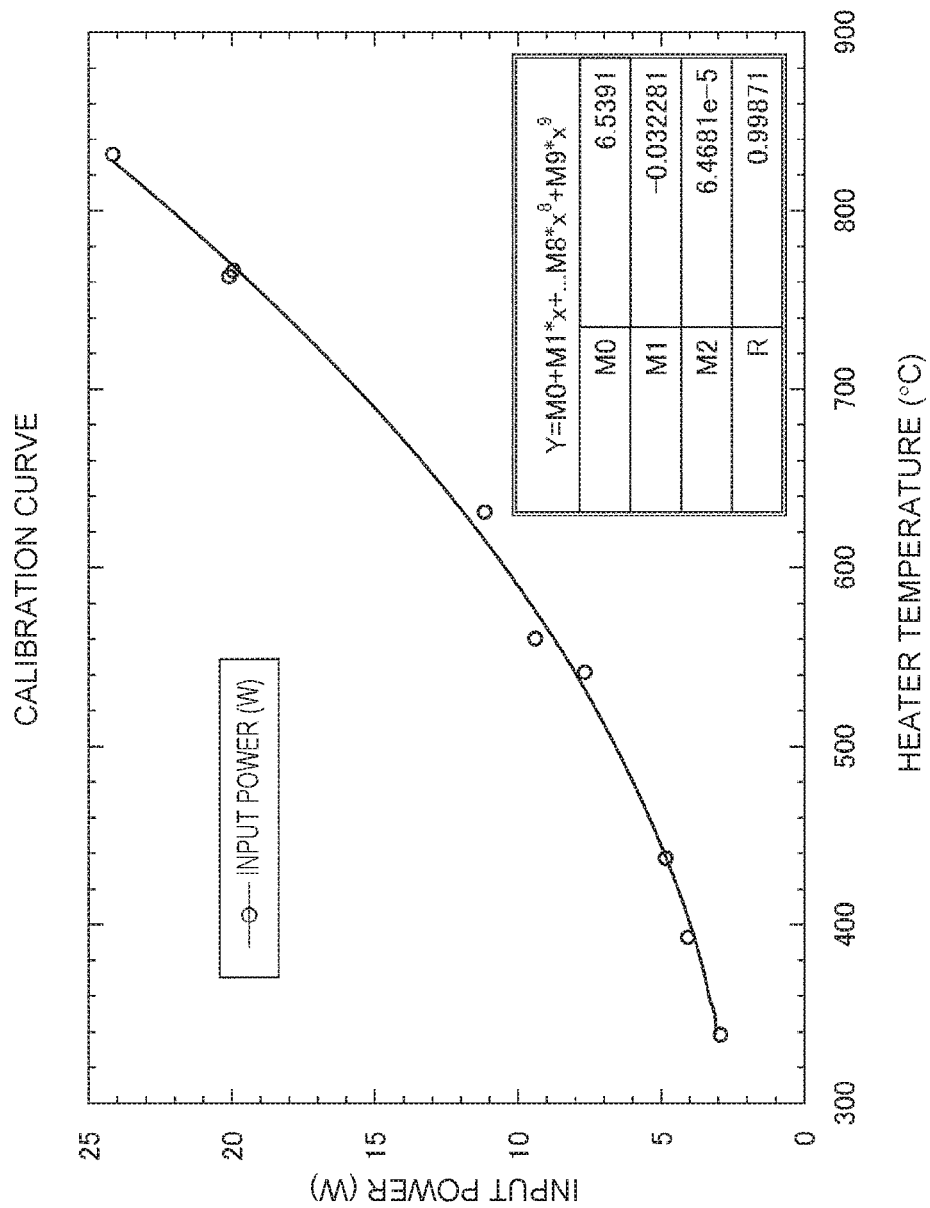

HEAT GENERATING DEVICE AND METHOD FOR GENERATING HEAT

TECHNICAL FIELD

The present invention relates to a heat generating device and a method for generating heat.

BACKGROUND OF ART

In recent years, attention has been focused on a heat generation phenomenon that generates heat using a hydrogen storage alloy such as a palladium alloy (see, for example, NTL 1). As long as a heat generation phenomenon using a hydrogen storage metal or a hydrogen storage alloy can be controlled, heat generated by the hydrogen storage metal or the hydrogen storage alloy can be used as an effective heat source. In recent years, from the viewpoint of environmental problems, the arrival of a hydrogen energy based society is expected, and thus it is desirable to obtain hydrogen energy that is safe and has a high energy density.

CITATION LIST

Non Patent Literature

NTL 1: A. Kitamura. et. al "Brief summary of latest experimental results with a mass-flow calorimetry system for anomalous heat effect of nano-composite metals under D(H)-gas charging" CURRENT SCIENCE, VOL. 108, NO. 4, p. 589-593, 2015

SUMMARY OF INVENTION

Technical Problem

Under the current circumstances, however, excess heat with respect to input power is as low as several percent to several tens of percent, and the absolute value of the amount of heat to be generated is insufficient. For this reason, development of new heat generating device and method for generating heat that generate excess heat is desired.

The present invention has been made in view of the above problem, and an object thereof is to propose a heat generating device and a method for generating heat capable of generating excess heat.

Solution to Problem

In order to solve the above-described problem, a heat generating device of the present invention includes: a container into which a hydrogen-based gas contributing to heat generation is configured to be introduced; a heat generating element provided inside the container; and a heater configured to heat the heat generating element. The heat generating element includes: a base made of a hydrogen storage metal, a hydrogen storage alloy, or a proton conductor; and a multilayer film provided on a surface of the base. The multilayer film having a stacking configuration of; a first layer that is made of a hydrogen storage metal or a hydrogen storage alloy and has a layer shape with a thickness of less than 1000 nm; and a second layer that is made of a hydrogen storage metal, a hydrogen storage alloy, or ceramics different from that of the first layer and has a layer shape with a thickness of less than 1000 nm.

A heat generating device of the present invention includes: a container into which a hydrogen-based gas contributing to heat generation is configured to be introduced; and a plurality of heat generating structures provided inside the container, each heat generating structure including a heat generating element and a heater configured to heat the heat generating element. The heat generating element includes: a base made of a hydrogen storage metal, a hydrogen storage alloy, or a proton conductor; and a multilayer film provided on a surface of the base. The multilayer film having a stacking configuration of: a first layer that is made of a hydrogen storage metal or a hydrogen storage alloy and has a layer shape with a thickness of less than 1000 nm; and a second layer that is made of a hydrogen storage metal, hydrogen storage alloy, or ceramics different from that of the first layer and has a layer shape with a thickness of less than 1000 nm.

A method for generating heat of the present invention includes: a preparation step of preparing a heat generating element including a multilayer film provided on a surface of a base made of a hydrogen storage metal, a hydrogen storage alloy, or a proton conductor, the multilayer film having a stacking configuration of a first layer that is made of a hydrogen storage metal or a hydrogen storage alloy and has a layer shape with a thickness of less than 1000 nm and a second layer that is made of a hydrogen storage metal, a hydrogen storage alloy, or ceramics different from that of the first layer and has a layer shape with a thickness of less than 1000 nm; a preparation step of preparing a container in which the heat generating element is installed; a hydrogen occluding step of introducing a hydrogen-based gas contributing to heat generation into the container and occluding hydrogen in the heat generating element; and a heating step of heating the heat generating element in which the hydrogen is occluded, to generate excess heat equal to or higher than a heating temperature.

Advantageous Effects of Invention

According to the present invention, it is possible to generate excess heat by allowing hydrogen to permeate through a first layer and a second layer of a multilayer film.

BRIEF DESCRIPTION OF DRAWINGS

FIG. 2 is an exploded view illustrating a configuration of a heat generating structure.

FIG. 4 is a graph illustrating a relation between an input power and a heater temperature in an Ni-plate simple substance.

DESCRIPTION OF EMBODIMENTS

Embodiments of the present invention will be described below with reference to the drawings.

(1) Overall Configuration of Heating Generating Device of the Present Invention

Figure 1:
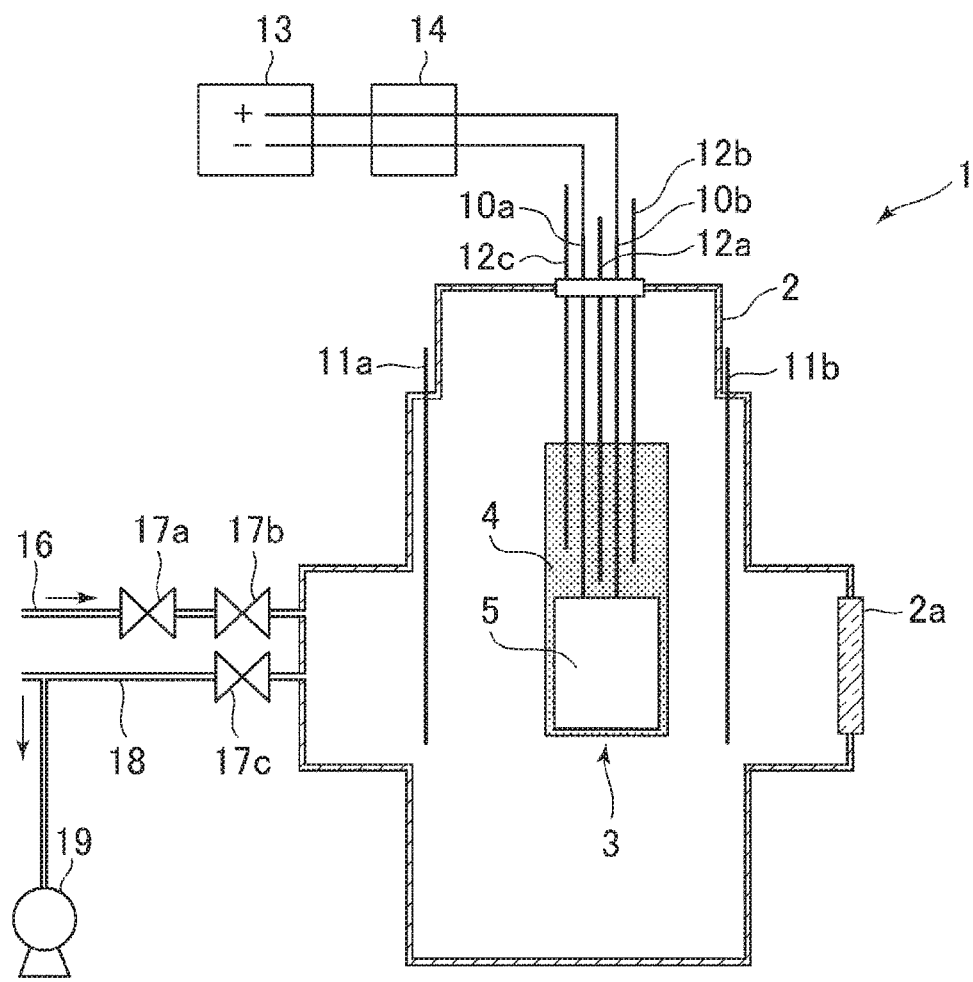
FIG. 1 is a schematic diagram illustrating a configuration of a heat generating device according to the present invention.

As illustrating in FIG. 1, a heat generating device 1 of the present invention includes a container 2 into which hydrogen-based gas contributing to heat generation is configured to be introduced, and has a configuration in which a heat generating structure 3 with a built-in heater is provided inside the container. The heat generating device 1 is configured such that after the hydrogen-based gas is introduced into the container, a heat generating element 5 (which will be described below) is heated by a heater (not illustrated) in the heat generating structure 3, and thus the heat generating element 5 generates excess heat equal to or higher than a heating temperature. As the hydrogen-based gas introduced into the container, deuterium gas and/or natural hydrogen gas can be applied. The natural hydrogen gas refers to hydrogen-based gas containing 99.985% or more of protium gas.

The container 2 is formed of, for example, stainless (SUS306 or SUS316), and the inside of the container can be a sealed space. Reference numeral 2a denotes a window portion formed of a transparent member such as Koval-glass and having a configuration in which an operator can directly visually check an inside state of the container 2 while maintaining the sealed state in the container 2. The container 2 is provided with a hydrogen-based gas introduction path 16, and hydrogen-based gas is introduced into the container from the hydrogen-based gas introduction path 16 through regulating valves 17a and 17b. Thereafter, the introduction of the hydrogen-based gas into the container 2 from the hydrogen-based gas introduction path 16 is stopped by the regulating valves 17a and 17b, and a certain amount of the hydrogen-based gas is stored inside the container. Reference numeral 19 denotes a dry pump, and can exhaust a gas in the container 2 to the outside of the container 2 through an exhaust path 18 and a regulating valve 17c as necessary and can perform a vacuum exhaust, a pressure adjustment, and the like.

The container 2 includes a plurality of temperature measuring units 11a, 11b, 12a, 12b, and 12c which are provided therein at predetermined positions. In a case of this embodiment, the temperature measuring units 11a and 11b are provided along an inner wall of the container 2 and can measure a temperature of the inner wall. The other temperature measuring units 12a, 12b, and 12c are provided in a holder 4 that holds the heat generating element 5 in the heat generating structure 3 and can measure a temperature in the holder 4. The temperature measuring units 12a, 12b, and 12c have different lengths, respectively, and can measure temperatures of a bottom closer to the heat generating element 5, a top away from the heat generating element 5, and an intermediate part in the middle of the top and the bottom, in the holder 4, for example.

The holder 4 includes a heater (to be described below) with a built-in thermocouple inside a region where the heat generating element 5 is disposed. The heater is connected to wirings 10a and 10b via an external heating power source 13, and can heat the heat generating element 5 to a predetermined temperature and measure a temperature thereof with the thermocouple. Reference numeral 14 denotes an ammeter-voltmeter that is provided on the wirings 10a and 10b and can measure input current/input power applied to the heater during heating of the heater. A heating temperature when the heat generating element 5 is heated by the heater varies depending on types of hydrogen storage metals forming the heat generating element 5, but is at least 300° C. or higher, preferably 500° C. or higher, and more preferably 600° C. or higher.

(2) Configuration of Heat Generating Structure

The heat generating structure 3 will be described below. As illustrated in FIG. 2, the heat generating structure 3 includes the holder 4 formed by a pair of half-body holders 4a and 4b, and has a configuration in which the heat generating element 5, a substrate 7, and the heater 6 are interposed between the half-body holders 4a and 4b. The heater 6 is a plate-like ceramic heater, for example, and is formed in a quadrilateral outer shape. The plurality of wirings 10a and 10b (two in FIG. 1, but four in FIG. 2) connected to the heater 6 are disposed in grooves (not illustrated) provided in the half-body holders 4a and 4b and is interposed between the half-body holders 4a and 4b.

The heater 6 includes a thermocouple (not illustrated) therein, and can measure a temperature with the thermocouple. The heater 6 has planes opposite to each other, the substrates 7 made of, for example, $SiO_2$ are provided on the planes, respectively, and the plate-like heat generating elements 5 are provided on the surfaces of these substrates 7, respectively. Thus, the heat generating structure 3 has a configuration in which the heater 6 is interposed between the heat generating elements 5 via the substrates 7. The substrate 7 and the heat generating element 5 is formed in the same outer shape as the outer shape of the heater 6, and when the substrate 7 and the heat generating element 5 are superimposed on the heater 6, the heater 6, the substrate 7, and the heat generating element 5 coincide in outer shape with each other and can be integrated.

The first half-body holder 4a is formed of ceramics in a rectangular shape, and includes an opening 9a provided at a predetermined position. In the first half-body holder 4a, the heat generating element 5 is disposed in the opening 9a and the heat generating element 5 is exposed from the region of the opening 9a. As in the first half-body holder 4a, the second half-body holder 4b is formed of ceramics in a rectangular shape. The second half-body holder 4b includes an opening 9b at an overlapping position with the opening 9a of the first half-body holder 4a when being integrated with the first half-body holder 4a by overlapping.

In the second half-body holder 4b, a stepped portion 9c is provided at a peripheral edge of the opening 9b on a contact surface 9d that contacts with the first half-body holder 4a. In the stepped portion 9c, the heat generating element 5, the substrate 7, and the heater 6 are fitted and positioned. Thus, in the second half-body holder 4b, when the heat generating element 5 is fitted into the stepped portion 9c, the heat generating element 5 is disposed in the opening 9 and the heat generating element 5 is exposed from the region of the opening 9b. The heat generating element 5, the substrate 7, and the heater 6 fitted into the stepped portion 9c are accommodated in the stepped portion 9c and is built in the holder 4 by being suppressed by an abutting surface on a peripheral edge of the opening 9a in the first half-body holder 4a when the half-body holders 4a and 4b are superimposed on each other.

(3) Heat Generating Element

Figure 3A:
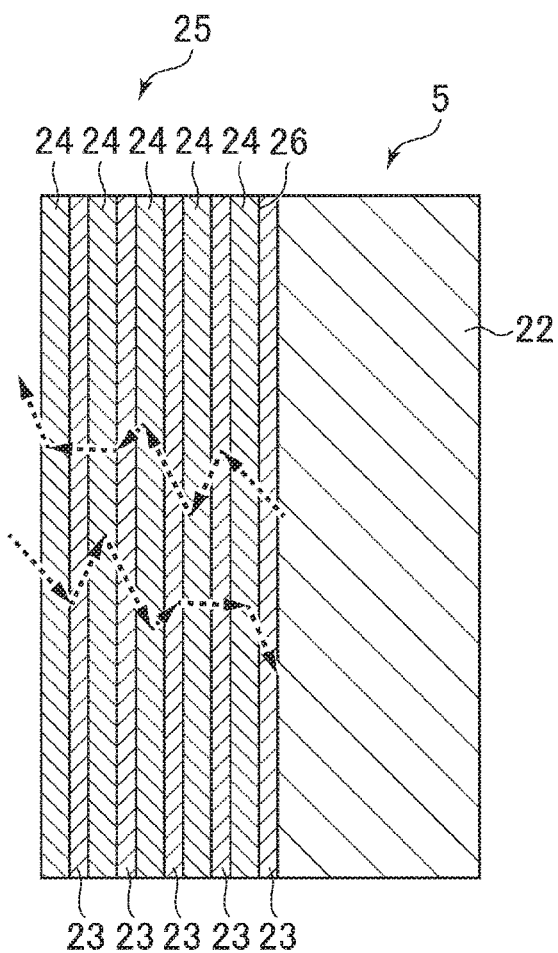
FIG. 3A is a sectional view illustrating a sectional configuration of a heat generating element.

The heat generating element 5 will be described below. As illustrated in FIG. 3A, the heat generating element 5 includes a base 22 made of a hydrogen storage metal, a hydrogen storage alloy, or a proton conductor, and has a configuration in which a multilayer film 25 is provided on a surface of the base 22. The base 22 includes the multilayer film 25 provided on the surface thereof, and can support the multilayer film 25. Examples of the hydrogen storage metals forming the base 22 can include Ni, Pd, V, Nb, Ta, and Ti, and examples of the hydrogen storage alloys forming the base 22 can include $LaNi_5$, $CaCu_5$, $MgZn_2$, $ZrNi_2$, $ZrCr_2$, TiFe, TiCo, $Mg_2Ni$, and $Mg_2Cu$. Examples of the proton conductors can include $BaCeO_3$-based (for example, $Ba(Ce_{0.95}Y_{0.05})O_{3-6})_r$ $SrCeO_3$-based (for example, $Sr(Ce_{0.95}Y_{0.05})O_{3-6}$), $CaZrO_3$-based (for example, $CaZr_{0.95}Y_{0.05}O_{3-\alpha}$), $SrZrO_3$-based (for example, $SrZr_{0.9}Y_{0.1}O_{3-\alpha}$), $\beta$-$Al_2O_3$, and $\beta$-$Ga_2O_3$.

The multilayer film 25 is formed by alternately stacking a first layer 23 made of a hydrogen storage metal or a hydrogen storage alloy and a second layer 24 made of a hydrogen storage metal, a hydrogen storage alloy, or ceramics different from that of the first layer 23, and a heterogeneous material interface can be formed between the first layer 23 and the second layer 24. For example, the first layer 23 is preferably made of any one of Ni, Pd, Cu, Cr, Fe, Mg, Co, and alloys thereof. Examples of the alloys of the first layer 23 may be alloys obtained by adding an additive element to Ni, Pd, Cu, Cr, Fe, Mg, or Co, but, more preferably, may be alloys made of two or more of Ni, Pd, Cu, Cr, Fe, Mg, and Co.

The second layer 24 is preferably made of any one of Ni, Pd, Cu, Cr, Fe, Mg, Co, alloys thereof, and SiC. Examples of the alloys of the second layer 24 may be alloys obtained by adding an additive element to Ni, Pd, Cu, Cr, Fe, Mg, or Co, but, more preferably, may be alloys made of two or more of Ni, Pd, Cu, Cr, Fe, Mg, and Co.

Particularly, as a combination of the first layer 23 and the second layer 24, when a kind of element is expressed as "first layer 23-second layer 24 (second layer 24-first layer 23)", Pd—Ni, Ni—Cu, Ni—Cr, Ni—Fe, Ni—Mg, and Ni—Co are desirable. In addition, when the second layer 24 is made of ceramics, it is desirable that the "first layer 23-second layer 24" is Ni—SiC. Here, the multilayer film 25 formed by the first layer 23 and the second layer 24 will be described, and other types of multilayer films including further a third layer and a fourth layer will be described below.

Since the first layer 23 and the second layer 24 desirably maintains a nanostructure that does not exhibit bulk properties, the first layer 23 and the second layer 24 desirably have a thickness of less than 1000 nm. Further, the first layer 23 and the second layer 24 desirably have a thickness of less than 500 nm so as to maintain a nanostructure that does not exhibit completely bulk properties.

Figure 3B:
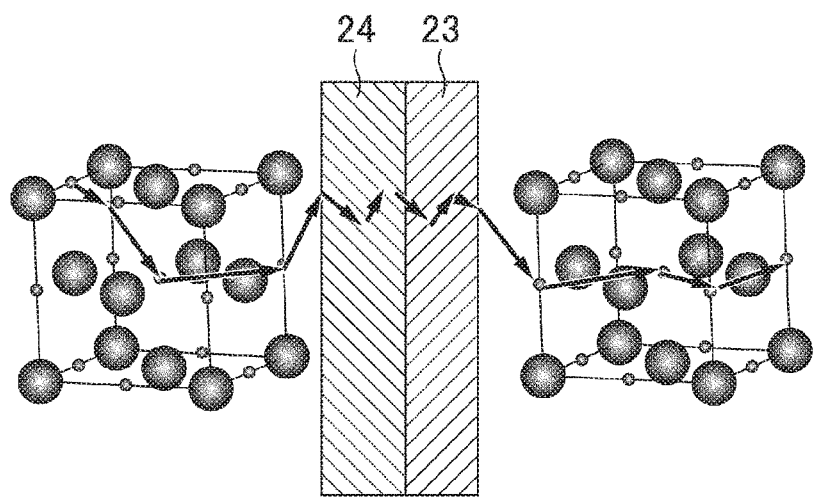
FIG. 3B is a schematic diagram for explanation of excess heat generated in a multilayer film.

The heat generating element 5 has a configuration in which the first layer 23 and the second layer 24 are formed with a thickness of a nano-size (less than 1000 nm) and these first layer 23 and second layer 24 are alternately provided, whereby hydrogen (hydrogen atoms) permeates through each of the heterogeneous material interfaces 26 between the first layer 23 and the second layer 24 as illustrated in FIG. 3A. Here, FIG. 3B is a schematic diagram illustrating a state in which when hydrogen is occluded into the first layer 23 and the second layer 24 of a face-centered cubic structure made of a hydrogen storage metal and then the first layer 23 and the second layer 24 are heated, hydrogen in a metal lattice of the first layer 23 permeates through the heterogeneous material interface 26 and moves into a metal lattice of the second layer 24.

In the heat generating element 5, a hydrogen-based gas is introduced into the container, and thus hydrogen (deuterium or protium) is occluded by the multilayer film 25 and the base 22. In the heat generating element 5, even when the introduction of the hydrogen-based gas into the container is stopped, a state can be maintained in which the hydrogen is occluded by the multilayer film 25 and the base 22. In the heat generating element 5, when heating is started by the heater 6, the hydrogen occluded in the multilayer film 25 and the base 22 is discharged and hops in the multilayer film 25 in a manner of quantum diffusion.

It is known that hydrogen is light and hops in hydrogen-occupied sites (octahedral and tetrahedral sites) of substance A and substance B in a manner of quantum diffusion. In the heat generating element 5, heating is performed by the heater 6 in a vacuum state, thereby hydrogen permeates through the heterogeneous material interface 26 between the first layer 23 and the second layer 24 by quantum diffusion or hydrogen diffuses into the heterogeneous material interface 26, and thus excess heat equal to or higher than a heating temperature can be generated. Since the first layer 23 and the second layer 24 are successively formed in a vacuum state at the time of manufacturing, a natural oxide film is not formed between the first layer 23 and the second layer 24 and only the heterogeneous material interface 26 is desirably formed therebetween.

In this embodiment, the case is described in which the plurality of first layers 23 and the second layers 24 are provided and two or more heterogeneous material interfaces 26 are provided by alternately stacking these first layers 23 and second layers 24, but the present invention is not limited thereto; that is, at least one first layer 23 and at least one second layer 24 may be provided and at least one heterogeneous material interface 26 may be provided.

The heat generating element 5 illustrated in FIGS. 3A and 3B can be manufactured as follows. First, after the plate-like base 22 is prepared, the hydrogen storage metal or the hydrogen storage alloy forming the first layer 23 and the second layer 24 is made into a gas phase state using a deposition apparatus, and the first layer 23 and the second layer 24 are alternately formed on the base 22 by aggregation or adsorption. Thus, the heat generating element 5 can be manufactured. In addition, it is preferable to form unevenness on the surface of the base 22 using chemical etching, for example.

As a deposition apparatus for forming the first layer 23 and the second layer 24, a physical deposition apparatus for depositing a hydrogen storage metal or a hydrogen storage alloy using a physical method can be applied. An example of the physical deposition apparatus may preferably include a sputtering apparatus for depositing a hydrogen storage metal or a hydrogen storage alloy on the base 22 by sputtering, a vacuum deposition apparatus, or CVD (Chemical Vapor Deposition) apparatus. In addition, a hydrogen storage metal or a hydrogen storage alloy are precipitated on the base 22 by an electroplating method, and thus the first layer 23 and the second layer 24 may be alternately formed.

(4) Verification Test (4-1) Ni Plate as Comparative Example

The heat generating device 1 illustrated in FIG. 1 was manufactured, and a verification test was performed as to whether excess heat equal to or higher than the heating temperature was generated in the heat generating element 5. Here, in order to evaluate first the excess heat in the heat generating element 5, a relation between an input power and a heat generation temperature of the heater 6 was investigated only using an Ni plate instead of the heat generating element 5. Specifically, using an Ni plate (also referred to as Ni simple substance) instead of the heat generating element 5 with the configuration illustrated in FIG. 2, Ni plates were respectively provided on both surfaces of the heater 6 via the substrate 7 made of $SiO_2$, and these were sandwiched between the ceramic half-body holders 4a and 4b to produce an Ni plate structure.

As the heater 6, a micro ceramic heater (MS-1000R) with a built-in thermocouple (1000° C. compatible; 25 mm square) manufactured by Sakaguchi E.H VOC Corp. was used. The substrate 7 has a thickness of 0.3 mm and was installed on the surface of the heater 6. Further, the Ni plate was installed on the surface of the substrate 7. The Ni plate was formed corresponding to the outer shape of the heater 6 to have length and width of 25 mm and a thickness of 0.1 mm.

As illustrated in FIG. 1, the Ni plate structure described above instead of the heat generating structure 3 was provided in the container 2 made of stainless, and the Ni plate was heated by the heater 6 in the container 2 of the sealed space without introduction of the hydrogen-based gas into the container. At this time, a temperature was measured by the thermocouple built in the heater 6. Then, as illustrated in FIG. 4, a calibration curve was made by a least-squares method, the curve indicating a relation between an input power (W) of the heater 6 set when the heater 6 heats a simple Ni plate not having multilayer films and a temperature (that is, a heater temperature (° C.)) of the Ni plate at the time of the input power. In FIG. 4, Y represents a function indicating a calibration curve, M0 represents a constant term, M1 represent a first-order coefficient, M2 represents a second-order coefficient, and R represents a correlation coefficient.

(4-2) Multilayer Film Including First Layer Made of Pd and Second Layer Made of Ni (Example 1)

Figure 5:
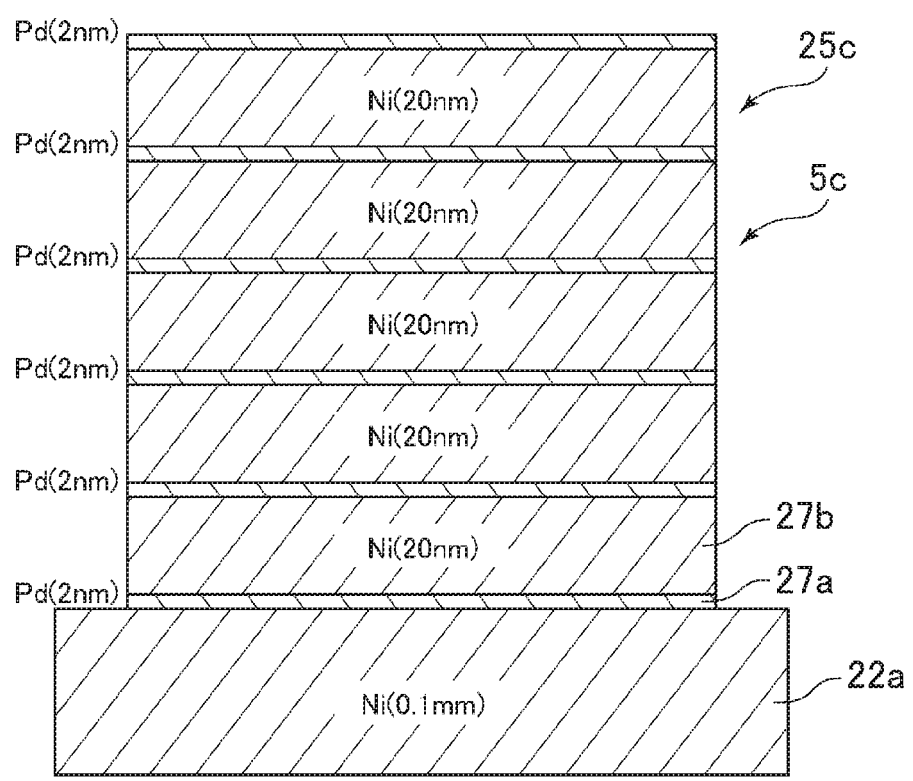
FIG. 5 is a sectional view illustrating a sectional configuration of a heat generating element according to Example 1 used in a verification test.

Next, as illustrated in FIG. 5, a first layer 27a made of Pd and a second layer 27b made of Ni were alternately stacked on a base 22a made of Ni, and a heat generating element 5c including a multilayer film 25c was manufactured. Next, a heat generating structure 3 as illustrated in FIG. 2 was manufactured using the heat generating element 5c. Then, as illustrated in FIG. 1, the heat generating structure 3 was installed in the container 2 to investigate the presence or absence of excess heat.

The heat generating element 5c was manufactured as follows. First, an Ni base 22a having a length and width of 25 mm and a thickness of 0.1 mm was prepared. The base 22a was placed inside a sputtering apparatus, and a Pd first layer 27a was formed using an Ar gas and a Pd target. In addition, an Ni second layer 27b was formed using an Ar gas and an Ni target in the sputtering apparatus. The sputtering apparatus is manufactured using an ion source manufactured by Miratron Co.

First, the first layer 27a was formed on the base 22a, and then the second layer 27b was formed on the first layer 27a. The first layer 27a was formed in six layers and the second layer 27b was formed in five layers, and the first layers 27a and the second layers 27b were alternately formed. The first layer 27a had a thickness of 2 nm, and the second layer 27b had a thickness of 20 nm. The first layer 27a and the second layer 27b were successively formed in the sputtering apparatus while maintaining a vacuum state. Thus, a heterogeneous material interface was formed without formation of a natural oxide film between the first layer 27a and the second layer 27b.

Figure 6:
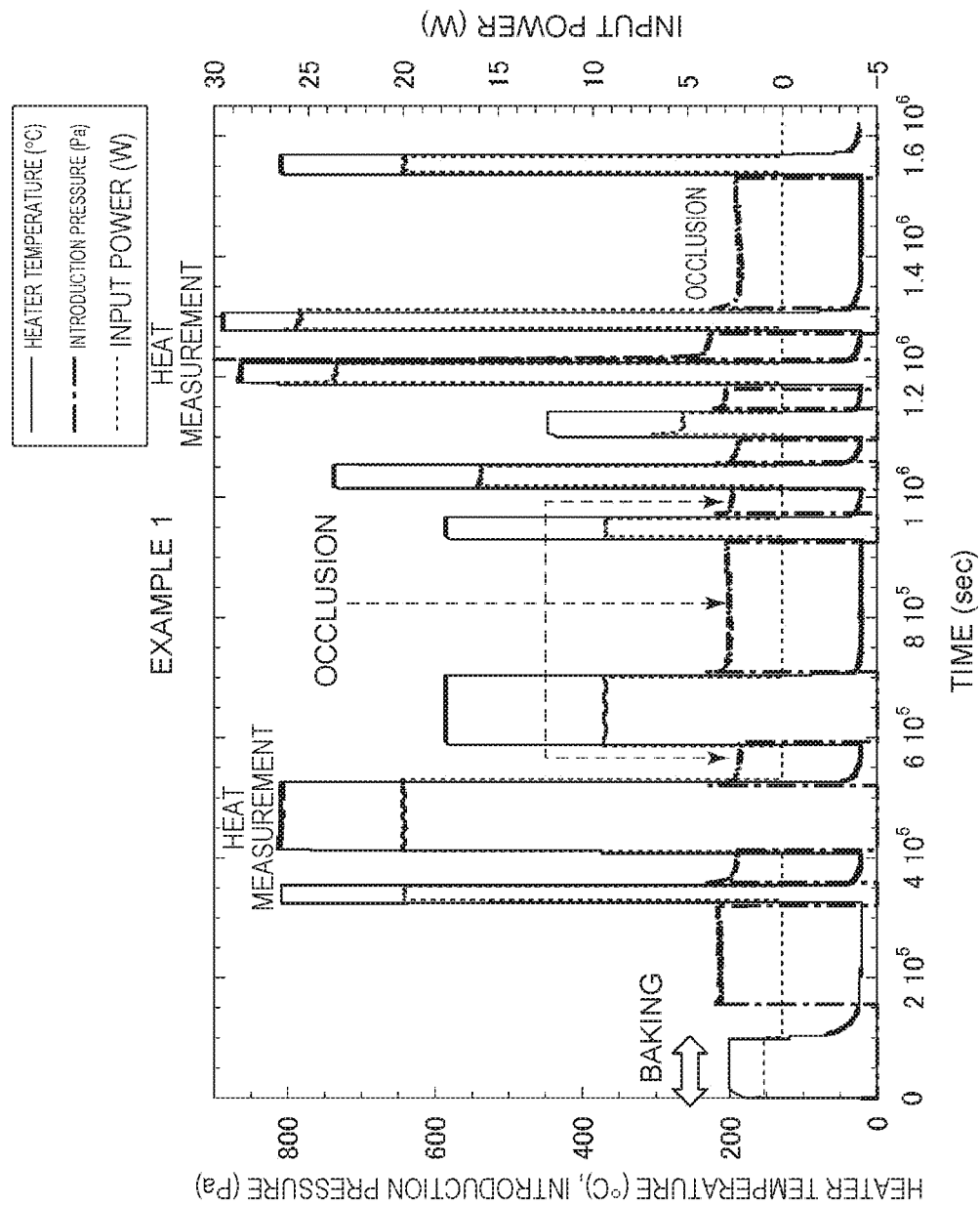
FIG. 6 is a graph illustrating a transition of input power, heater temperature, and hydrogen introduction pressure at the time of verification test.

Then, in a heat generating device 1 in which the heat generating element 5c is provided inside a container, as illustrated in FIG. 6, hydrogen occlusion and heating with a heater 6 were performed. Specifically, first, the inside of the container was heated by the heater 6 and was baked at 200° C. or higher for about 36 hours to blow off water or the like on the surface of the heat generating element 5c. Next, after the heating with the heater 6 was stopped, a natural hydrogen gas (produced by Numata Oxygen Co., grade 2; purity 99.999 vol % or more) was introduced into the container at about 250 Pa, and hydrogen was occluded into the heat generating element 5c for about 64 hours.

Next, after the introduction of the natural hydrogen gas into the container was stopped, heating with the heater 6 was started at an input power of 20 W, vacuuming was started, and the temperature at the time of heating with the heater 6 was measured ("heat measurement" in FIG. 5). The temperature was measured by the thermocouple built in the heater 6. In this way, a hydrogen occluding step of introducing the natural hydrogen gas into the container to occlude the hydrogen in the heat generating element 5c and a heating step of heating the heat generating element 5c in a vacuum state with the heater 6 were repeated. Then, the temperature during the heating step was measured by the thermocouple built in the heater 6.

As illustrated in FIG. 6, the input power of the heater 6 was set to 1 W during baking, and then set to 20 W, 20 W, 10 W, 10 W, 16 W, 5 W, 24 W, 25 W, and 20 W with hydrogen occluding step. Then, the temperature of the heat generating element 5c during the heating step of heating with each input power was measured.

The input power of the heater 6 and the measured temperature were compared with the calibration curve of the blank run (Ni simple substance) illustrated in FIG. 4, heat (excess heat) generated excessively further than the heat at the input power in FIG. 4 was calculated. Specifically, first, the input power set in the heater 6 during the heating of the heat generating element 5c was recorded, the temperature of the heat generating element 5c at this time was measured by the thermocouple provided in the heater 6 (hereinafter, the measured temperature of the heat generating element is referred to as a measurement temperature). Next, power corresponding to the measurement temperature (hereinafter, referred to as conversion power) was obtained from the calibration curve of the blank run (Ni simple substance) illustrated in FIG. 4.

Figure 7A:
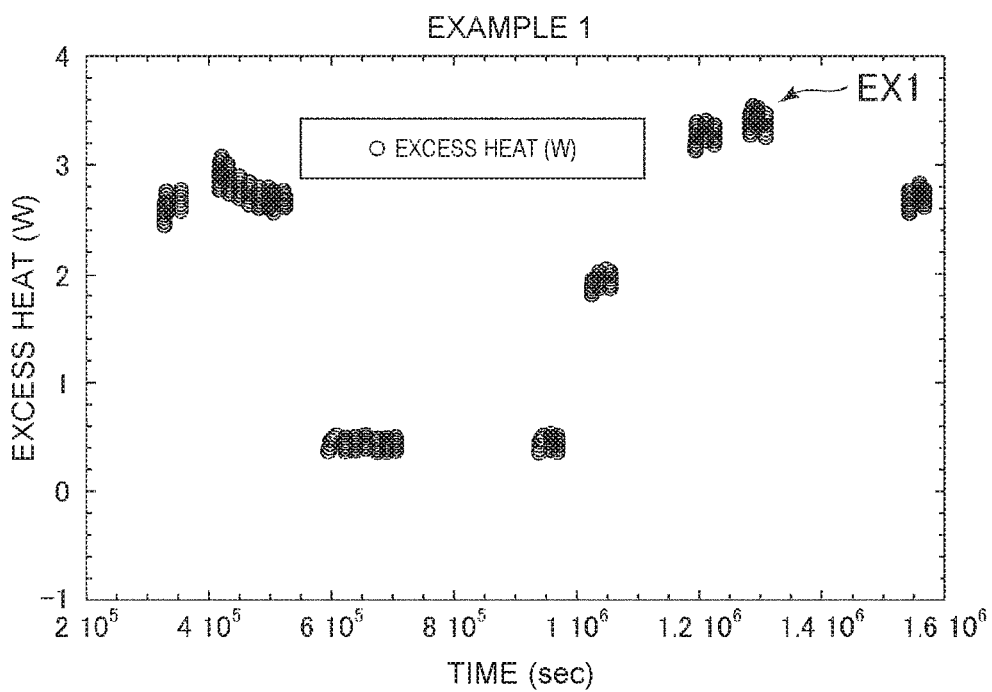
FIG. 7A is a graph illustrating a transition of excess heat in Example 1.

Next, a difference between the obtained conversion power and the input power during the heating of the heat generating element 5c was calculated, and the difference was used as power of excess heat. Thus, a result as illustrated in FIG. 7A was obtained. FIG. 7A does not illustrate excess heat when the input power of the heater 6 is 5 W.

In FIG. 7A, an elapsed time was indicated on an abscissa, and the power of excess heat was indicated on an ordinate. It was confirmed from FIG. 7A that in the heat generating element 5c provided with the multilayer film 25c, the temperature was equal to or higher than that in the case of the Ni plate and the excess heat equal to or higher than the heating temperature was generated. For example, when the heater 6 heats the heat generating element 5c at the input power of 25 W, the power of excess heat is "EX1" in FIG. 7A. When the input power of the heater 6 was 25 W, it was confirmed that excess heat from 3 W or higher and 4 W or lower was generated.

Figure 7B:
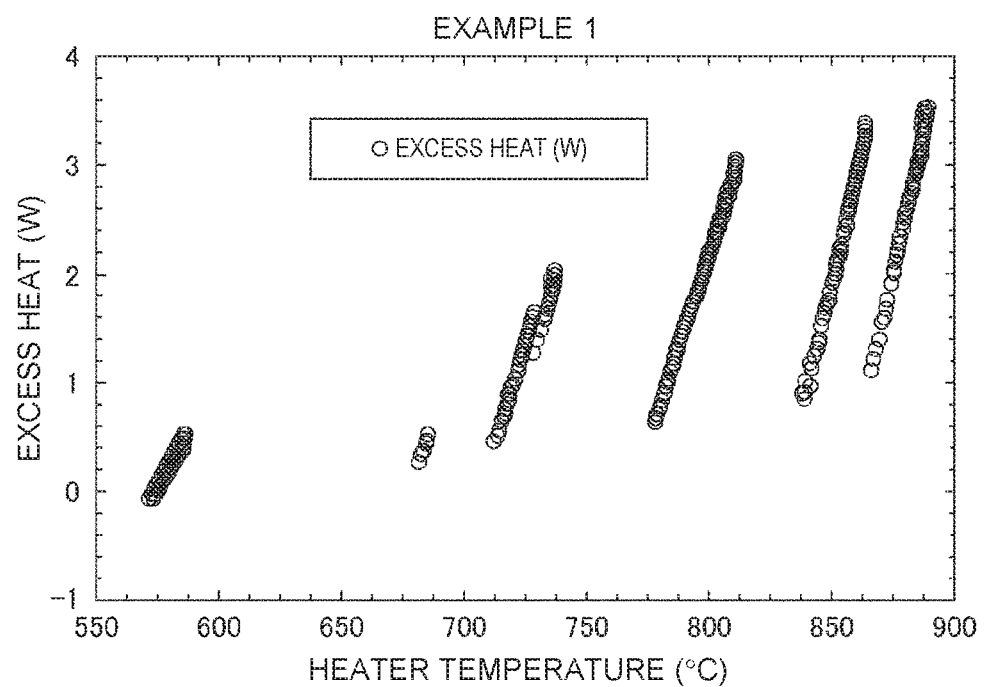
FIG. 7B is a graph illustrating a temperature dependence of excess heat in Example 1.
Figure 8:
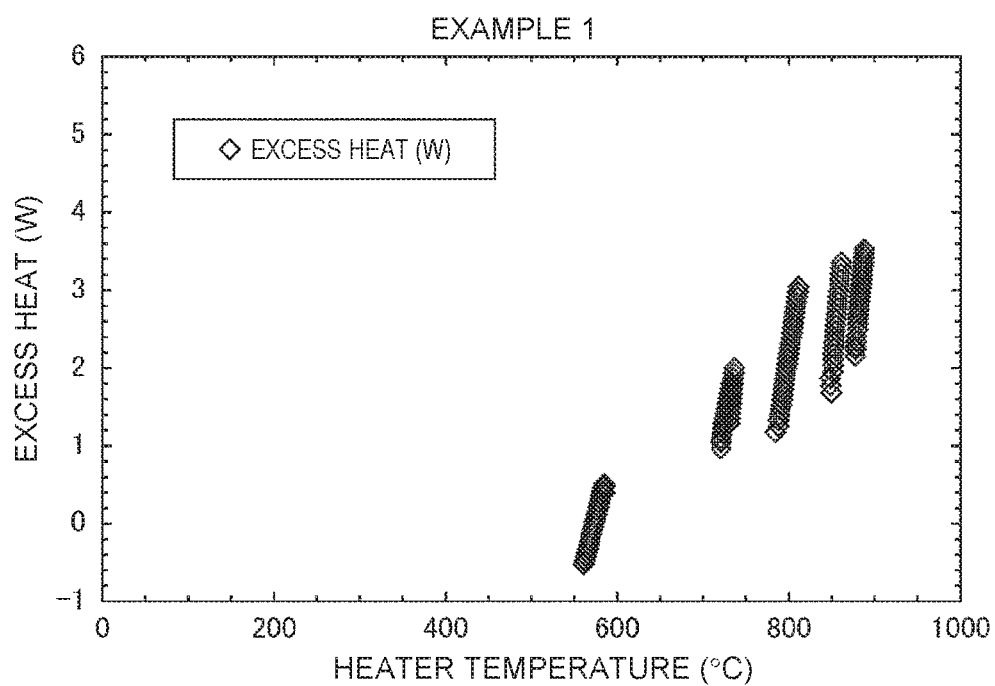
FIG. 8 is a graph obtained by extracting a part of FIG. 7B.

Further, investigation results on temperature dependence of the excess heat were obtained as illustrated in FIGS. 7B and 8. In FIGS. 7B and 8, a temperature measured by the thermocouple built in the heater 6 (measurement temperature) was indicated on an abscissa, and power of excess heat was indicated on an ordinate. FIG. 8 illustrates parts of data extracted by changing the abscissa of FIG. 7B. It was confirmed from FIGS. 7B and 8 that the excess heat had a positive correlation with the temperature.

(5) Operational Effects

In the above-described configuration, the heat generating device 1 is configured such that the base 22 made of the hydrogen storage metal, hydrogen storage alloy, or the proton conductor and the heat generating element 5 including the multilayer film 25 provided on the surface of the base 22 were provided inside the container. In addition, the heat generating element 5 is provided with the multilayer film 25 formed by stacking the first layer 23, which is made of the hydrogen storage metal or the hydrogen storage alloy and has a layer shape with the thickness of less than 1000 nm, and the second layer 24 which is made of the hydrogen storage metal, the hydrogen storage alloy, or the ceramics different from that of the first layer 23 and has a layer shape with the thickness of less than 1000 nm.

The heat generating device 1 was configured such that the hydrogen-based gas was introduced from the hydrogen-based gas introduction path 16 into the container, the hydrogen was occluded in the heat generating element 5, and then the heat generating element 5 was heated with the heater 6 and the vacuuming was performed at the same time. Thus, the heat generating device 1 could generate the excess heat equal to or higher than the heating temperature by allowing the hydrogen to permeate through the heterogeneous material interface 26 between the first layer 23 and the second layer 24 in a manner of quantum diffusion (see FIGS. 7A, 7B, and 8). Thus, the heat generating device 1 can generate the excess heat by allowing the hydrogen to permeate through the first layer 23 and the second layer 24 of the multilayer film 25.

(6) Multilayer Film of Another Embodiment

The above-described embodiment has the configuration in which the first layer 23 made of the hydrogen storage metal or the hydrogen storage alloy is provided on the surface of the base 22, and the second layer 24 made of the hydrogen storage metal, the hydrogen storage alloy, or the ceramics different from that of the first layer 23 is provided on the first layer 23, but the present invention is not limited thereto; for example, the first layer 23 and the second layer 24 may be stacked in reverse. That is, a configuration may be used in which the second layer 24 made of the hydrogen storage metal, the hydrogen storage alloy, or the ceramics is provided on the surface of the base 22, and the first layer 23 made of the hydrogen storage metal or the hydrogen storage alloy different from that of the second layer 24 is provided on the second layer 24.

(6-1) Heat Generating Element Including Third Layer

Figure 9A:
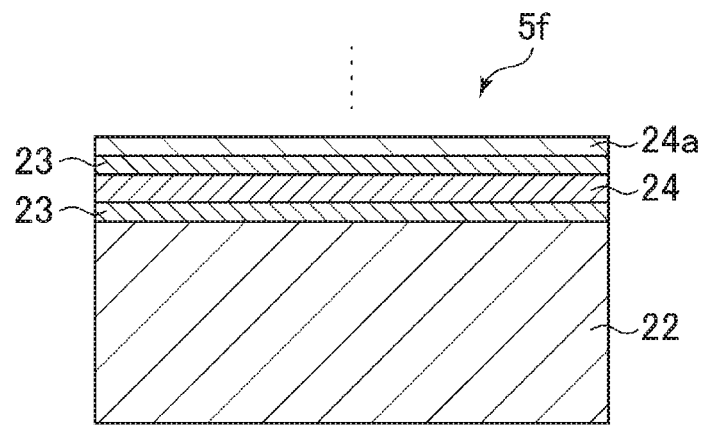
FIG. 9A is a sectional view illustrating a configuration of a heat generating element provided with a third layer.

In "(3) Heat generating element" described above, the multilayer film 25 obtained by alternately stacking the first layer 23 and the second layer 24 is described, but the present invention is not limited thereto; that is, as illustrated in FIG. 9A, a multilayer film may be configured in which, a third layer 24a made of hydrogen storage metals, hydrogen storage alloys, or ceramics different from those of the first layer 23 and the second layer 24 in a layer shape is stacked in addition to the first layer 23 and the second layer 24. As in the first layer 23 and the second layer 24, the third layer 24a desirably has a thickness of less than 1000 nm.

A heat generating element 5f provided with such a third layer 24a has a stacking configuration in which the first layer 23, the second layer 24, the first layer 23, and the third layer 24a are stacked in this order on the base 22 and the first layer 23 is interposed between the second layer 24 and the third layer 24a, and has a configuration in which the stacking configuration of such four layers is repeatedly provided. Even in such a configuration, hydrogen permeates through a heterogeneous material interface between the first layer 23 and the second layer 24 or a heterogeneous material interface between the first layer 23 and the third layer 24a in a manner of quantum diffusion, and thus excess heat equal to or higher than the heating temperature can be generated.

For example, the third layer 24a is preferably made of any one of Ni, Pd, Cu, Cr, Fe, Mg, Co, alloys thereof, SiC, CaO, $Y_2O_3$, and TiC. Examples of the alloys of the third layer 24a may be alloys obtained by adding an additive element to Ni, Pd, Cu, Cr, Fe, Mg, and Co, but particularly preferably alloys consisting of two or more of Ni, Pd, Cu, Cr, Fe, Mg, and Co. When the third layer 24a made of any of CaO, $Y_2O_3$, and TiC is provided, the amount of hydrogen occluded in the heat generating element 5f can be increased, and the amount of hydrogen permeating through the heterogeneous material interface can be increased, thereby high excess heat can be obtained.

However, since the hydrogen is difficult to permeate through CaO, $Y_2O_3$, and TiC, the third layer 24a made of any one of these CaO, $Y_2O_3$, and TiC is desirably formed to be extremely thin with a thickness of less than 1000 nm, particularly a thickness of 10 nm or less. The third layer 24a made of any one of CaO, $Y_2O_3$, and TiC may be formed in an island shape instead of being formed in a complete film shape. In addition, the first layer 23 and the third layer 24a are successively formed while maintaining a vacuum state, and the heterogeneous material interface is desirably formed without forming a natural oxide film between the first layer 23 and the third layer 24a.

The heat generating element 5f provided with the third layer 24a may have a stacking configuration in which the second layer 24 and the third layer 24a are stacked in any order, for example, by changing the order of the second layer 24 and the third layer 24a in FIG. 9A and the first layer 23 is interposed between the second layer 24 and the third layer 24a, and may have a configuration in which the stacking configuration of such four layers is repeatedly provided. Further, the third layer 24a may be provided in one or more layers on the heat generating element.

In particular, examples of a combination of the first layer 23, the second layer 24, and the third layer 24a desirably include, when a kind of element is expressed as "first layer-third layer-second layer", Pd—CaO—Ni, Pd—$Y_2O_3$—Ni, Pd—TiC—Ni, Ni—CaO—Cu, Ni—$Y_2O_3$—Cu, Ni—TiC—Cu, Ni—CaO—Cr, Ni—$Y_2O_3$—Cr, Ni—TiC—Cr, Ni—CaO—Fe, Ni—$Y_2O_3$—Fe, Ni—TiC—Fe, Ni—CaO—Mg, Ni—$Y_2O_3$—Mg, Ni—TiC—Mg, Ni—CaO—Co, Ni—$Y_2O_3$—Co, Ni—TiC—Co, Ni—Cr—Fe, Ni—CaO—SiC, Ni—$Y_2O_3$—SiC, and Ni—TiC—SiC.

(6-2) Heat Generating Element Including Third Layer and Fourth Layer

Figure 9B:
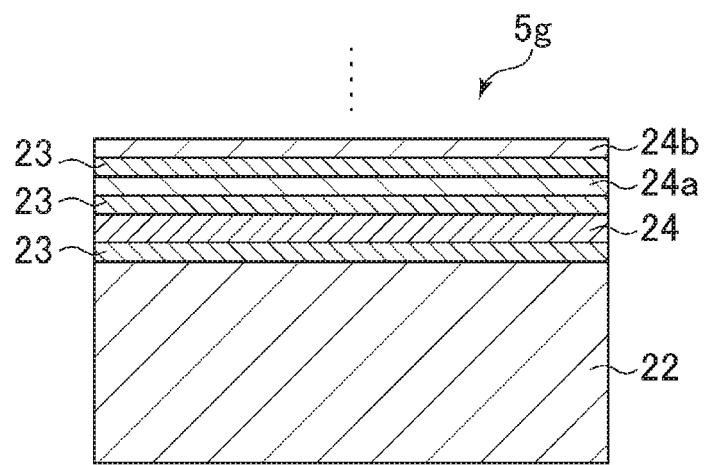
FIG. 9B is a sectional view illustrating a configuration of a heat generating element provided with a third layer and a fourth layer.

Further, as illustrated in FIG. 9B, another multilayer film may be configured in which a fourth layer 24b made of hydrogen storage metals, hydrogen storage alloys, or ceramics different from those of the first layer 23, the second layer 24, and the third layer 24a in a layer shape is stacked in addition to the first layer 23, the second layer 24, and the third layer 24a. As in the first layer 23, the second layer 24, and the third layer 24a, the fourth layer 24b preferably has a thickness of less than 1000 nm.

For example, the fourth layer 24b may be made of any one of Ni, Pd, Cu, Cr, Fe, Mg, Co, alloys thereof, SiC, CaO, $Y_2O_3$, and TiC. Examples of the alloys of the fourth layer 24b may be alloys obtained by adding an additive element to Ni, Pd, Cu, Cr, Fe, Mg, and Co, particularly preferably, alloys consisting of two or more of Ni, Pd, Cu, Cr, Fe, Mg, and Co.

A heat generating element 5g provided with the fourth layer 24b desirably has a stacking configuration in which the second layer 24, the third layer 24a, and the fourth layer 24b are stacked in any order and the first layer 23 is provided between the second layer 24 and the third layer 24a and between the third layer 24a and the fourth layer 24b and between the fourth layer 24b and the second layer 24, and a configuration in which the stacking configuration of these six layers is repeatedly provided. That is, the heat generating element is desirable that the first layer 23, the second layer 24, the first layer 23, the third layer 24a, the first layer 23, and the fourth layer 24b are stacked in this order as illustrated in FIG. 9B, or, although not illustrated, the first layer 23, the fourth layer 24b, the first layer 23, the third layer 24a, the first layer 23, and the second layer 24 are stacked in this order. Further, the fourth layer 24b may be provided in one or more layers on the heat generating element.

In particular, examples of a combination of the first layer 23, the second layer 24, the third layer 24a, and the fourth layer 24b desirably include, when a kind of element is expressed as "first layer-fourth layer-third layer-second layer", Ni—CaO—Cr—Fe, Ni—$Y_2O_3$—Cr—Fe, and Ni—TiC—Cr—Fe.

When the fourth layer 24b made of any one of CaO, $Y_2O_3$, and TiC is provided, the amount of hydrogen occluded in the heat generating element 5g can be increased, and the amount of hydrogen permeating through the heterogeneous material interface can be increased, thereby high excess heat can be obtained. The fourth layer 24b made of any one of these CaO, $Y_2O_3$, and TiC is desirably formed extremely thin with a thickness of less than 1000 nm, particularly, a thickness of 10 nm or less. The fourth layer 24b made of any one of CaO, $Y_2O_3$, and TiC may be formed in an island shape instead of being formed in a complete film shape. In addition, the first layer 23 and the fourth layer 24b are successively formed while maintaining a vacuum state, and the heterogeneous material interface is desirably formed without forming a natural oxide film between the first layer 23 and the fourth layer 24b.

(7) Verification Test Using Other Configurations of Multilayer Films

Here, a heat generating element including various configurations of multilayer films was manufactured, and a verification test was performed, in the same manner as the above-described "(4) verification test", as to whether excess heat equal to or higher than a heating temperature was generated in the heat generating device 1 illustrated in FIG. 1.

(7-1) Multilayer Film in which First Layer Made of Pd is Thicker than Second Layer Made of Ni (Example 2)

Figure 10A:
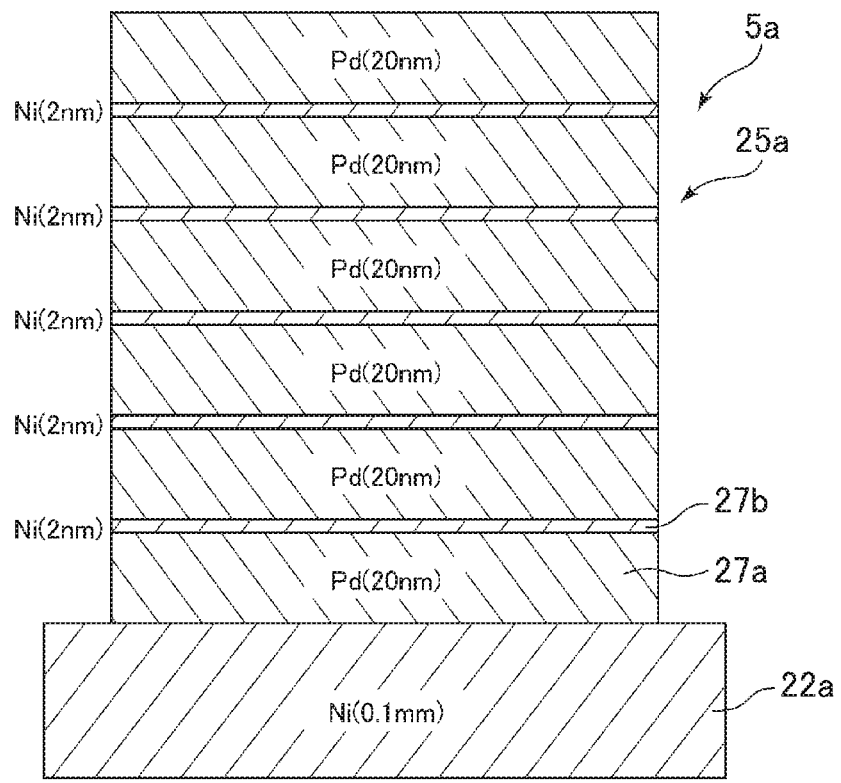
FIG. 10A is a sectional view illustrating a sectional configuration of a heat generating element according to Example 2.

As illustrated in FIG. 10A, a first layer 27a made of Pd and a second layer 27b made of Ni were alternately stacked on a base 22a made of Ni, and a heat generating element 5a including a multilayer film 25a was manufactured (hereinafter, referred to as Example 2). In the heat generating element 5c illustrated in FIG. 5 described above, the first layer 27a is formed thinner than the second layer 27b, but in the heat generating element 5a illustrated in FIG. 10A, the first layer 27a is formed thicker than the second layer 27b.

Next, a heat generating structure 3 as illustrated in FIG. 2 was manufactured using the heat generating element 5a. Then, as illustrated in FIG. 1, the heat generating structure 3 was installed inside the container 2 to investigate the presence or absence of excess heat. The heat generating element 5a was manufactured as follows. First, an Ni base 22a having a length and width of 25 mm and a thickness of 0.1 mm was prepared, and was installed inside the sputtering apparatus described above. In the sputtering apparatus, the Pd first layer 27a was formed using an Ar gas and a Pd target, and the Ni second layer 27b was formed using an Ar gas and an Ni target.

First, the first layer 27a was formed on the base 22a, and then the second layer 27b was formed on the first layer 27a. The first layer 27a was formed in six layers and the second layer 27b was formed in five layers, and the first layers 27a and the second layers 27b were alternately formed. The first layer 27a had a thickness of 20 nm, and the second layer 27b had a thickness of 2 nm. The first layer 27a and the second layer 27b were successively formed in the sputtering apparatus while maintaining a vacuum state. Thus, a heterogeneous material interface was formed without formation of a natural oxide film between the first layer 27a and the second layer 27b.

In a heat generating device 1 in which the heat generating element 5a is provided inside the container, as in the above-described "(4-2) Multilayer Film formed by First Layer made of Pd and Second Layer made of Ni (Example 1)", as illustrated in FIG. 6, hydrogen occlusion and heating with a heater 6 were performed. Then, according to FIG. 6, a hydrogen occluding step of introducing the natural hydrogen gas into the container to occlude the hydrogen in the heat generating element 5a and a heating step of heating the heat generating element 5a in a vacuum state with the heater 6 by changing the input power of the heater 6 were repeated, the input power set during the heating step was recorded at the same time, and the temperature at this time was measured. Detailed conditions in the verification test are the same as those in "(4) Verification Test", and the description thereof will not be presented herein so as to avoid the duplication description.

A conversion voltage corresponding to the measurement temperature of the heat generating element 5a was obtained from the blank run (Ni simple substance) illustrated in FIG. 4, a difference between the obtained conversion power and the input power during the heating of the heat generating element 5a was calculated, and the difference was used as power (W) of excess heat. Thus, a result as illustrated in FIG. 10B was obtained.

Figure 10B:
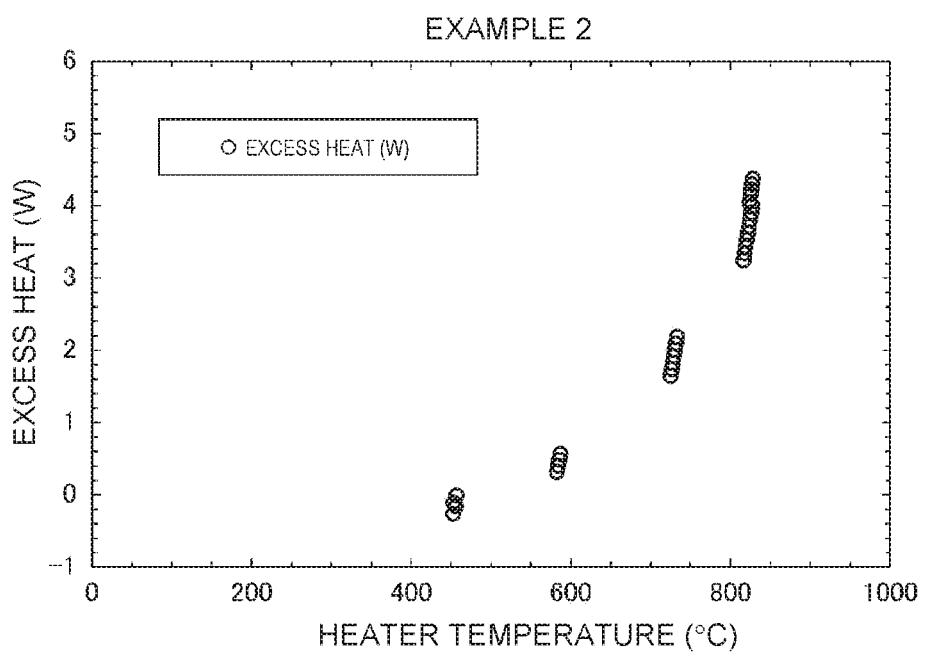
FIG. 10B is a graph illustrating a temperature dependence of excess heat calculated from the results measured using the heat generating element of FIG. 10A.

An ordinate in FIG. 10B indicates the power (W) of the excess heat. It was confirmed from FIG. 10B that the temperature was equal to or higher than that of the Ni plate and the excess heat equal to or higher than the heating temperature was generated even when the multilayer film 25a was provided in which the first layer made of Pd is thicker than the second layer made of Ni. In addition, it was confirmed from FIG. 10B that the excess heat had a positive correlation with the temperature.

(7-2) Multilayer Film Including First Layer Made of Pd, Second Layer Made of Ni, and Third Layer Made of CaO (Example 3)

Figure 11A:
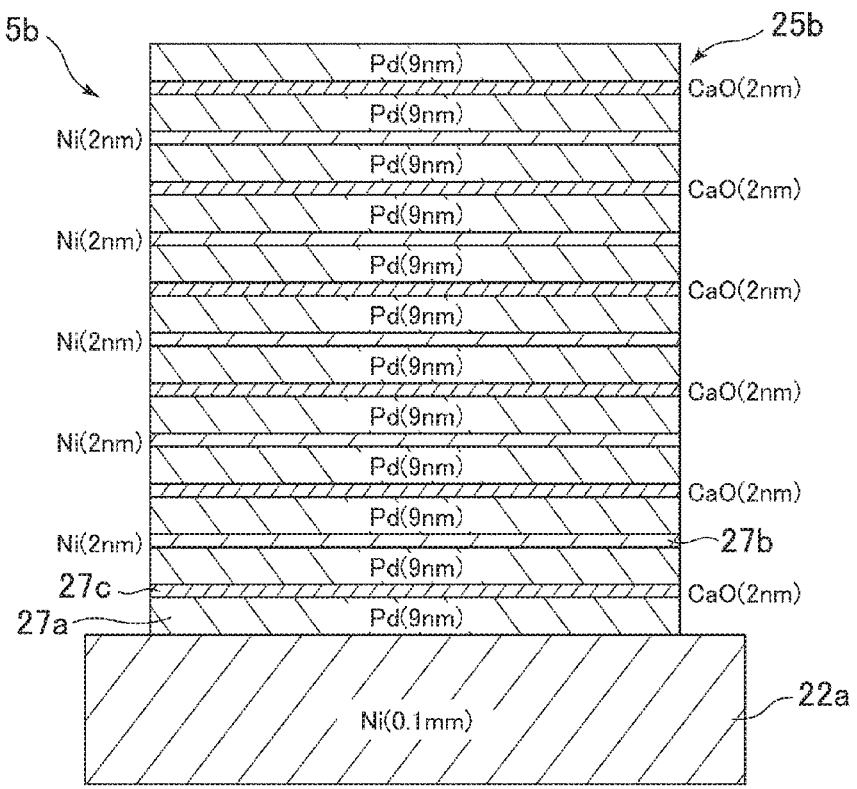
FIG. 11A is a sectional view illustrating a sectional configuration of a heat generating element according to Example 3.

As illustrated in FIG. 11A, a first layer 27a made of Pd, a second layer 27b made of Ni, and a third layer 27c made of CaO were stacked on a base 22a made of Ni, and a heat generating element 5b including a multilayer film 25b was manufactured. A heat generating structure 3 as illustrated in FIG. 2 was manufactured using the heat generating element 5b. Then, as illustrated in FIG. 1, the heat generating structure 3 was installed inside the container 2 to investigate the presence or absence of excess heat.

The heat generating element 5b was manufactured as follows. First, an Ni base 22a having a length and width of 25 mm and a thickness of 0.1 mm was prepared, and was installed inside the sputtering apparatus described above. In the sputtering apparatus, the Pd first layer 27a was formed using an Ar gas and a Pd target, the Ni second layer 27b was formed using an Ar gas and an Ni target, and the CaO third layer 27c was formed using an Ar gas and a CaO target.

First, after the first layer 27a was formed on the base 22a, the CaO third layer 27c was formed on the first layer 27a, the first layer 27a was formed again on the third layer 27c, and the Ni second layer 27b was further formed on the first layer 27a. Then, the first layer 27a was formed again on the second layer 27b, and the first layer 27a, the third layer 27c, the first layer 27a, and the second layer 27b were stacked in this order to manufacture the multilayer film 25b. The first layer 27a was formed in twelve layers, the third layer 27c was formed in six layers, and the second layer 27b was formed in five layers. The first layer 27a had a thickness of 9 nm, and the second layer 27b and the third layer 27c had a thickness of 2 nm.

Here, CaO is a non-metallic material and is a material through which hydrogen does not permeate. Therefore, the third layer 27c made of CaO was formed to be extremely thin with a thickness of 2 nm, so that CaO was formed in an island shape instead of being formed in a complete film shape. The first layer 27a, the third layer 27c, and the second layer 27b were successively formed while maintaining a vacuum state in the sputtering apparatus. Thus, heterogeneous material interfaces were formed without forming natural oxide films between the first layer 27a and the third layer 27c and between the first layer 27a and the second layer 27b.

In a heat generating device 1 in which the heat generating element 5b is provided inside the container, as described above, as illustrated in FIG. 6, hydrogen occlusion and heating with a heater 6 were performed. Then, according to FIG. 6, a hydrogen occluding step of introducing the natural hydrogen gas into the container to occlude the hydrogen in the heat generating element 5b and a heating step of heating the heat generating element 5b in a vacuum state with the heater 6 by changing the input power of the heater 6 were repeated, the input power set during the heating step was recorded at the same time, and the temperature at this time was measured.

A conversion voltage corresponding to the measurement temperature of the heat generating element 5b was obtained from the calibration curve of the blank run (Ni simple substance) illustrated in FIG. 4, a difference between the obtained conversion power and the input power during the heating of the heat generating element 5b was calculated, and the difference was used as power (W) of excess heat. Thus, a result as illustrated in FIG. 11B was obtained.

Figure 11B:
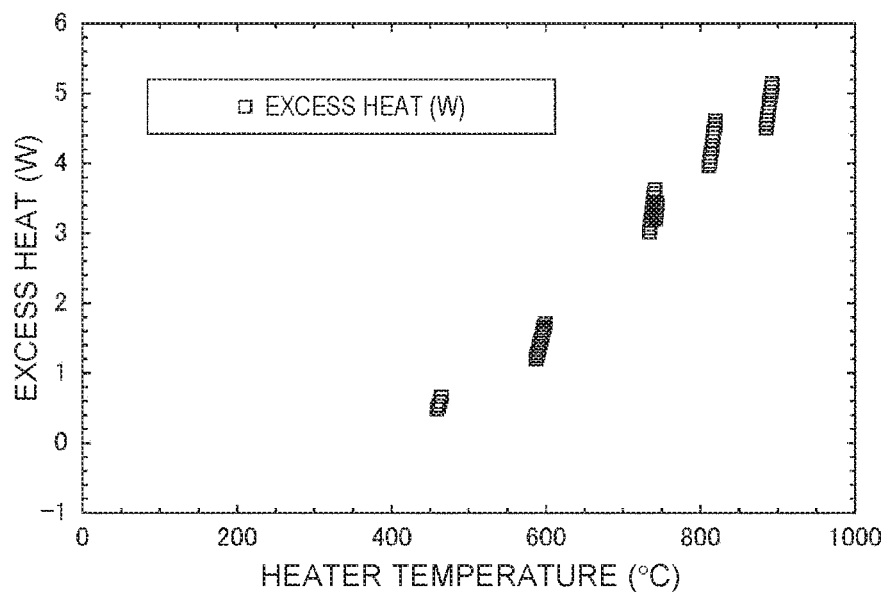
FIG. 11B is a graph illustrating a temperature dependence of excess heat calculated from the results measured using the heat generating element of FIG. 11A.

It was confirmed from FIG. 11B that the temperature was equal to or higher than that of the Ni plate and the excess heat equal to or higher than the heating temperature was generated even in the multilayer film 25b including the CaO third layer 27c. In addition, it was confirmed that in the multilayer film 25b including the CaO third layer 27c, the power of the excess heat was equal to or higher than those in Examples 1 and 2 using only Pd and Ni. In the multilayer film 25b including the CaO third layer 27c, the amount of hydrogen to be occluded is increased, the amount of hydrogen permeating through the heterogeneous material interface is increased, and thus the power of excess heat rises. In addition, it was confirmed from FIG. 11B that the excess heat had a positive correlation with the temperature.

(7-3) Multilayer Film Including First Layer Made of Cu and Second Layer Made of Ni (Example 4)

Figure 12A:
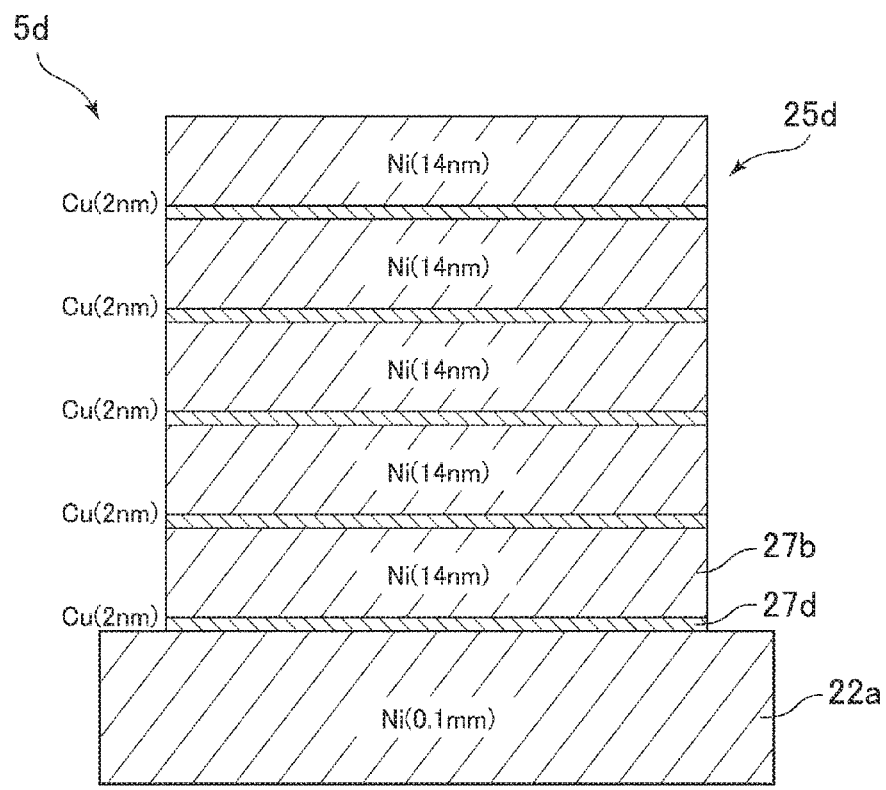
FIG. 12A is a sectional view illustrating a sectional configuration of a heat generating element according to Example 4.

As illustrated in FIG. 12A, a first layer 27d made of Cu and a second layer 27b made of Ni were stacked on a base 22a made of Ni, and a heat generating element 5d including a multilayer film 25d was manufactured. A heat generating structure 3 as illustrated in FIG. 2 was manufactured using the heat generating element 5d. Then, as illustrated in FIG. 1, the heat generating structure 3 was installed in the container 2 to investigate the presence or absence of excess heat.

The heat generating element 5d was manufactured as follows. First, an Ni base 22a having a length and width of 25 mm and a thickness of 0.1 mm was prepared, and was installed inside the sputtering apparatus described above. In the sputtering apparatus, the Cu first layer 27d was formed using an Ar gas and a Cu target, and the Ni second layer 27b was formed using an Ar gas and an Ni target.

First, the first layer 27d was formed on the base 22a, and then the second layer 27b was formed on the first layer 27d. The first layer 27d and the second layer 27b were alternately formed to manufacture a multilayer film 25d. The first layer 27d was formed in five layers and the second layer 27b was formed in five layers. The first layer 27d had a thickness of 2 nm, and the second layer 27b had a thickness of 14 nm. The first layer 27d and the second layer 27b were successively formed in the sputtering apparatus while maintaining a vacuum state. Thus, a heterogeneous material interface was formed without formation of a natural oxide film between the first layer 27d and the second layer 27b.

In a heat generating device 1 in which the heat generating element 5d is provided inside the container, as described above, as illustrated in FIG. 6, hydrogen occlusion and heating with a heater 6 were performed. Then, according to FIG. 6, a hydrogen occluding step of introducing the natural hydrogen gas into the container to occlude the hydrogen in the heat generating element 5d and a heating step of heating the heat generating element 5d in a vacuum state with the heater 6 by changing the input power of the heater 6 were repeated, the input power set during the heating step was recorded at the same time, and the temperature at this time was measured. However, since the sample prepared in Example 4 does not occlude hydrogen at room temperature, the sample was heated to about 200 to 300° C. by the heater 6 during the hydrogen occluding step to occlude the hydrogen.

Figure 12B:
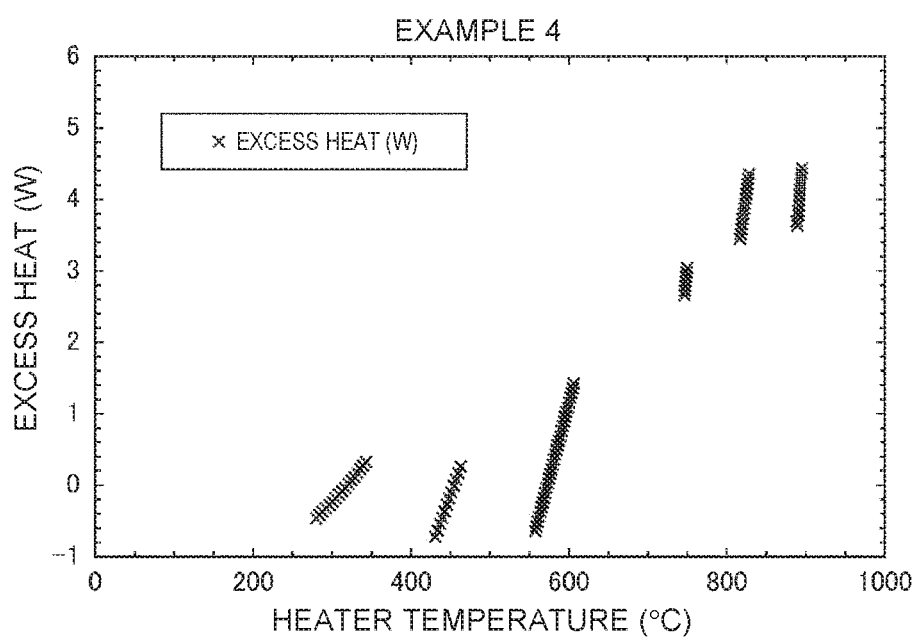
FIG. 12B is a graph illustrating a temperature dependence of excess heat calculated from the results measured using the heat generating element of FIG. 12A.

A conversion voltage corresponding to the measurement temperature of the heat generating element 5d was obtained from the calibration curve of the blank run (Ni simple substance) illustrated in FIG. 4, a difference between the obtained conversion power and the input power during the heating of the heat generating element 5b was calculated, and the difference was used as power (W) of excess heat. Thus, a result as illustrated in FIG. 12B was obtained. It was confirmed from FIG. 12B that the temperature was equal to or higher than that of the Ni plate and the excess heat equal to or higher than the heating temperature was generated even in the multilayer film 25d including the Cu first layer and the Ni second layer. In addition, it was confirmed from FIG. 12B that the excess heat had a positive correlation with the temperature.

The calibration curve illustrated in FIG. 4 does not illustrate data of 300° C. or lower; however, in Example 4, a calibration curve of 300° C. or lower was obtained based on FIG. 4, and thus the power (W) of the excess heat was obtained. The results illustrated in FIG. 12B were obtained.

(7-4) Multilayer Film Including First Layer Made of Ni, Second Layer Made of Cu, and Third Layer Made of CaO (Example 5)

Figure 13A:
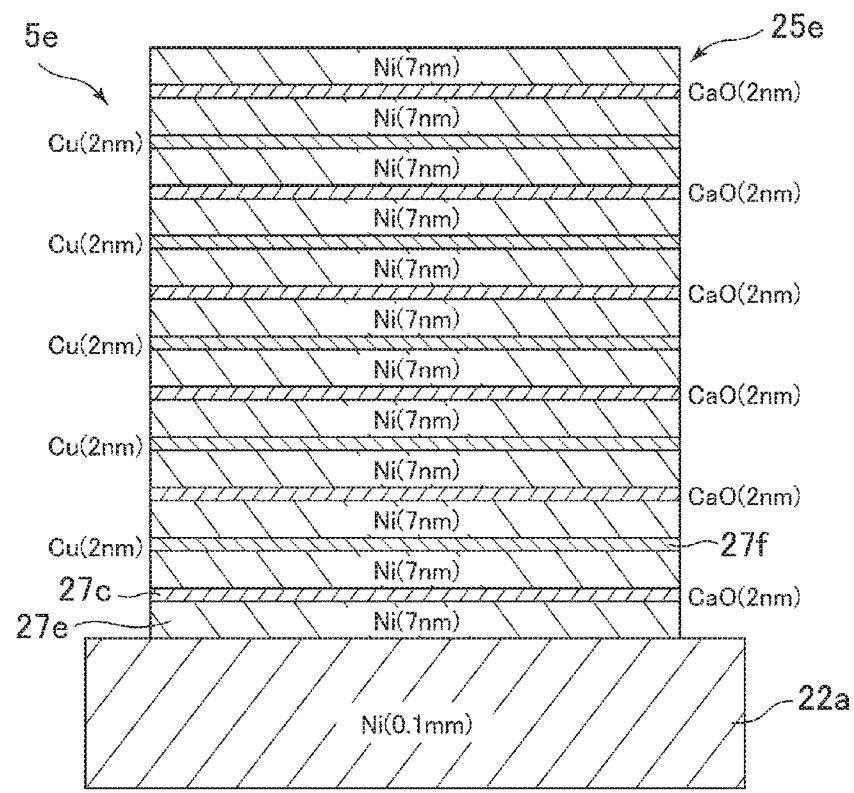
FIG. 13A is a sectional view illustrating a sectional configuration of a heat generating element according to Example 5.

As illustrated in FIG. 13A, a first layer 27e made of Ni, a second layer 27f made of Cu, and a third layer 27c made of CaO were stacked on a base 22a made of Ni, and a heat generating element 5e including a multilayer film 25e was manufactured. A heat generating structure 3 as illustrated in FIG. 2 was manufactured using the heat generating element 5e. Then, as illustrated in FIG. 1, the heat generating structure 3 was installed inside the container 2 to investigate the presence or absence of excess heat.

The heat generating element 5e was manufactured as follows. First, an Ni base 22a having a length and width of 25 mm and a thickness of 0.1 mm was prepared, and was installed inside the sputtering apparatus described above. In the sputtering apparatus, the Ni first layer 27e was formed using an Ar gas and an Ni target, the Cu second layer 27f was formed using an Ar gas and a Cu target, and the CaO third layer 27c was formed using an Ar gas and a CaO target.

First, after the first layer 27e was formed on the base 22a, the CaO third layer 27c was formed on the first layer 27e, the first layer 27e was formed again on the third layer 27c, and the Cu second layer 27f was further formed on the first layer 27e. Then, the first layer 27e was formed again on the second layer 27f, and the first layer 27e, the third layer 27c, the first layer 27e, and the second layer 27f were stacked in this order to manufacture the multilayer film 25e. The first layer 27e was formed in twelve layers, the third layer 27c was formed in six layers, and the second layer 27f was formed in five layers. The first layer 27e had a thickness of 7 nm, and the second layer 27f and the third layer 27c had a thickness of 2 nm.

As in Example 3 described above, the third layer 27c made of CaO was formed to be extremely thin with a thickness of 2 nm, so that CaO was formed in an island shape instead of being formed in a complete film shape. The first layer 27e, the third layer 27c, and the second layer 27f were successively formed while maintaining a vacuum state in the sputtering apparatus. Thus, heterogeneous material interfaces were formed without forming natural oxide films between the first layer 27e and the third layer 27c and between the first layer 27e and the second layer 27f.

In a heat generating device 1 in which the heat generating element 5e is provided inside the container, as described above, as illustrated in FIG. 6, hydrogen occlusion and heating with a heater 6 were performed. Then, according to FIG. 6, a hydrogen occluding step of introducing the natural hydrogen gas into the container to occlude the hydrogen in the heat generating element 5e and a heating step of heating the heat generating element 5e in a vacuum state with the heater 6 by changing the input power of the heater 6 were repeated, the input power set during the heating step was recorded at the same time, and the temperature at this time was measured. In Example 5, however, the sample was heated to about 200 to 300° C. by the heater 6 during the hydrogen occluding step to occlude the hydrogen.

Next, a conversion voltage corresponding to the measurement temperature of the heat generating element 5e was obtained from the calibration curve of the blank run (Ni simple substance) illustrated in FIG. 4, a difference between the obtained conversion power and the input power during the heating of the heat generating element 5e was calculated, and the difference was used as power (W) of excess heat. Thus, a result as illustrated in FIG. 13B was obtained.

Figure 13B:
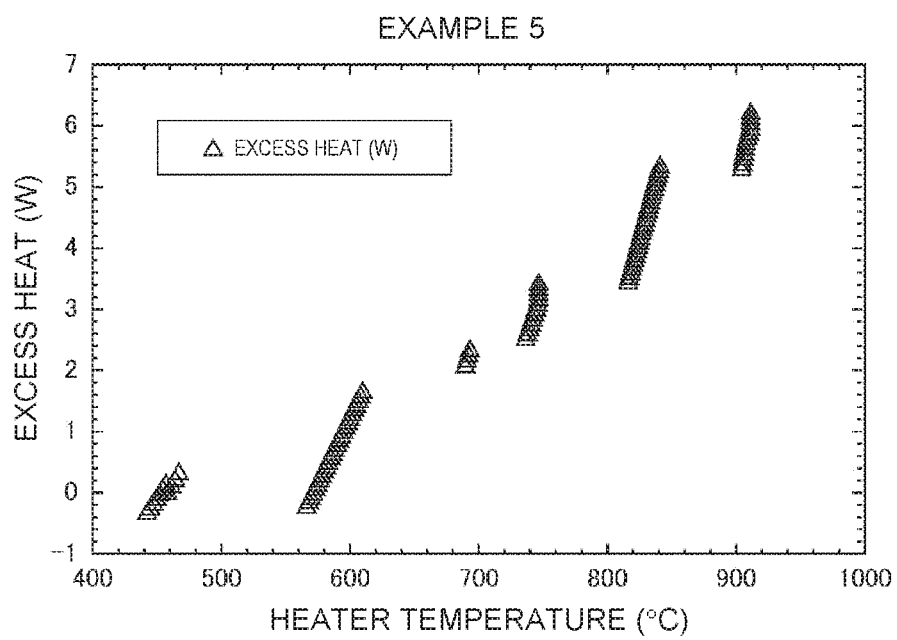
FIG. 13B is a graph illustrating a temperature dependence of excess heat calculated from the results measured using the heat generating element of FIG. 13A.

It was confirmed from FIG. 13B that the temperature was equal to or higher than that of the Ni plate and the excess heat equal to or higher than the heating temperature was generated even in such a multilayer film 25e. In addition, it was confirmed the multilayer film 25b including the CaO third layer 27c that the power of the excess heat was equal to or higher than that in Example 4 using only Ni and Cu. In the multilayer film 25e including the CaO third layer 27c, the amount of hydrogen to be occluded is increased, the amount of hydrogen permeating through the heterogeneous material interface is increased, and thus the power of excess heat rises. In addition, it was confirmed from FIG. 13B that the excess heat had a positive correlation with the temperature.

(7-5) Comparison of Examples 1 to 5

Figure 14:
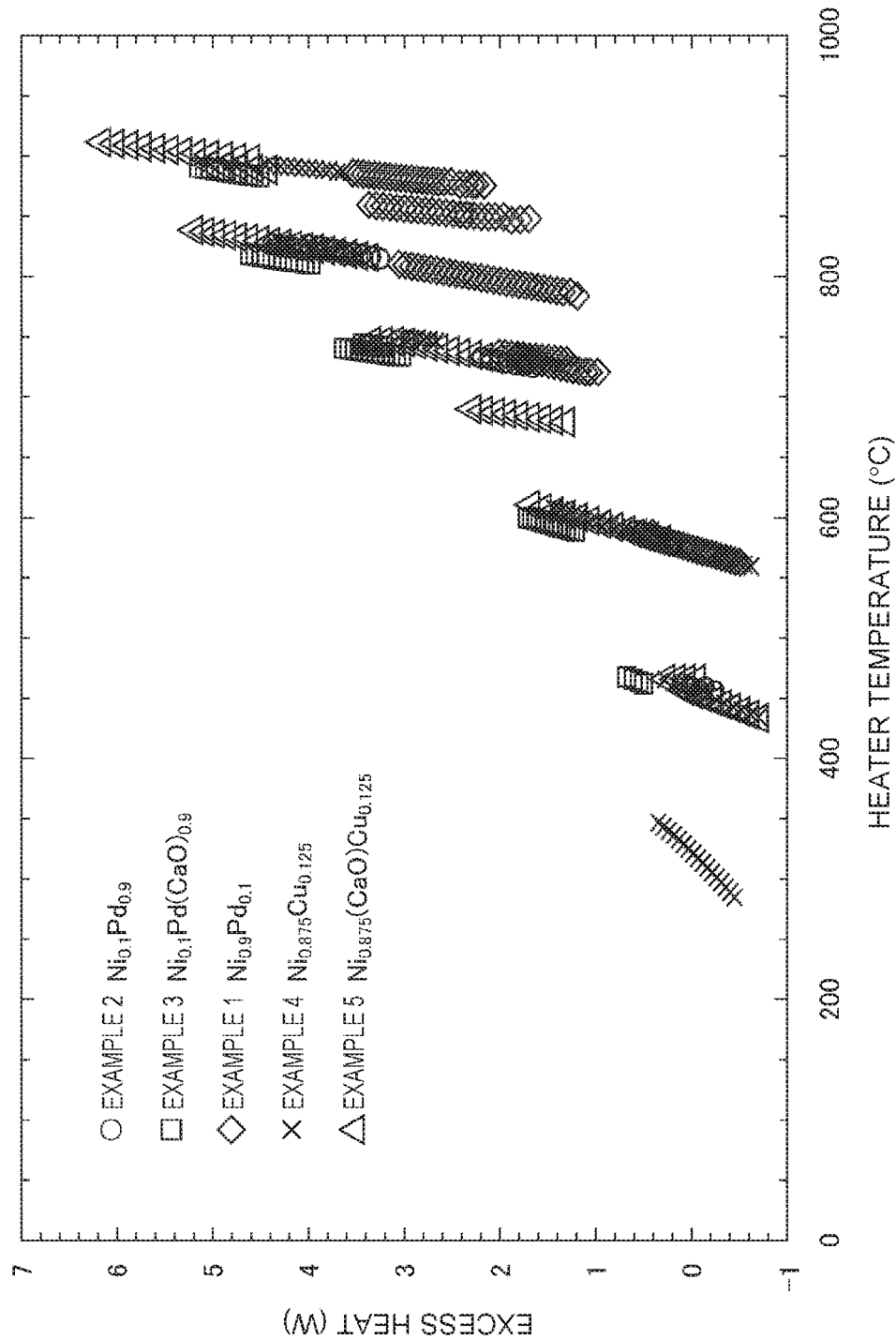
FIG. 14 is a graph by summarizing a temperature dependence of excess heat.

FIG. 14 is a graph obtained by summarizing FIG. 8 illustrating the excess heat in Example 1, FIG. 10B illustrating the excess heat in Example 2, FIG. 11B illustrating the excess heat in Example 3, FIG. 12B illustrating the excess heat in Example 4, and FIG. 13B illustrating the excess heat in Example 5. In FIG. 14, based on the thickness of each layer, Example 1 was expressed as "$Ni_{0.9}Pd_{0.1}$", Example 2 was expressed as "$Ni_{0.1}Pd_{0.9}$", Example 3 was expressed as "$Ni_{0.1}Pd(CaO)_{0.9}$", Example 4 was expressed as "$Ni_{0.875}Cu_{0.125}$", and Example 5 was expressed as "$Ni_{0.875}(CaO)Cu_{0.125}$".

It is confirmed from FIG. 14 that the excess heat in Examples 3 and 5 in which the CaO third layer 27c is provided is larger than that in Examples 1, 2, and 4 in which CaO is not contained. In addition, it is confirmed from FIG. 14 that, in some of Examples 2, 4, and 5, the excess heat may not be generated when the heating temperature due to the heater 6 is low, but the excess heat is generated by rising of the heating temperature due to the heater 6.

Figure 15:
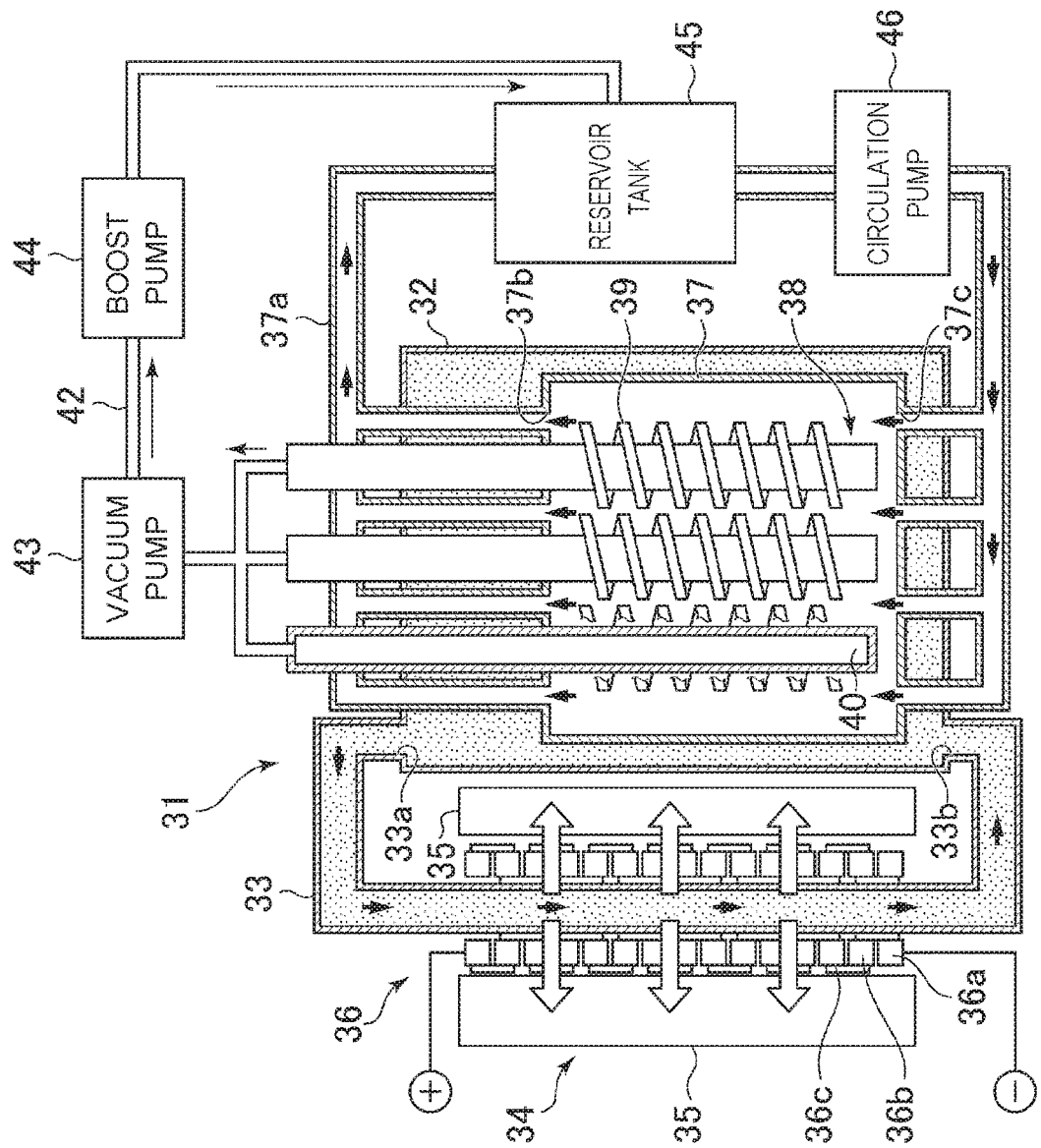
FIG. 15 is a schematic diagram illustrating a configuration of a permeation-type heat generating device.

(8) Permeation-Type Heat Generating Device (8-1) Overall Configuration of Permeation-Type Heating Generating Device A permeation-type heat generating device according to another embodiment will be described below. As illustrated in FIG. 15, a heat generating device 31 includes a container 37 in which a heat generating element 38 is provided inside the container, and a heat recovery container 32 in which a container 37 is accommodated. The heat recovery container 32 is provided with a recovery port 33a and an introduction port 33b, and a circulation path 33 is provided to communicate with the recovery port 33a and the introduction port 33b. In the circulation path 33, a fluid in the heat recovery container 32 is recovered from the recovery port 33a by a circulation apparatus (not illustrated), passes through the circulation path 33, and is again introduced into the heat recovery container 32 from the introduction port 33b. The fluid in the heat recovery container 32 is water, for example, and is heated by heat generated from the container 37.

The circulation path 33 has a configuration in which a thermoelectric converter 34 is provided, and thermoelectrically converts heat of the fluid heated in the heat recovery container 32 using the thermoelectric converter 34. The thermoelectric converter 34 includes a thermoelectric conversion element 36 in which an n-type semiconductor 36a and a p-type semiconductor 36b adjacent to each other are connected to each other by an electrode 36c along an outer tube periphery of the circulation path 33, and has a configuration in which a cooling body 35 is provided to surround the thermoelectric conversion element 36. The thermoelectric converter 34 can convert the heat of the fluid into electricity with the thermoelectric conversion element 36 using the Seebeck effect.

The heat generating device 31 is provided with a plurality of heat generating elements 38 in the container 37, and the heat generating element 38 is provided with a heater 39. The heat generating device 31 generates excess heat equal to or higher than a heating temperature with the heat generating element 38 by heating the heat generating element 38 with a heater (not illustrated) while allowing a hydrogen-based gas introduced into the container 37 to permeate through the heat generating element 38 (to be described below). Examples of the hydrogen-based gas introduced into the container 37 may include deuterium gas and/or natural hydrogen gas.

The container 37 is made of, for example, stainless (SUS306 or SUS316), and the inside of the container can be a sealed space. The container 37 is provided with a recovery port 37b and an introduction port 37c, and a hydrogen-based gas circulation path 37a is provided to communicate with the recovery port 37b and the introduction port 37c. The hydrogen-based gas circulation path 37a guides the hydrogen-based gas in the container 37 from the recovery port 37b into the hydrogen-based gas circulation path 37a using a circulation pump 46, and introduces the hydrogen-based gas from the introduction port 37c into the container 37 again through a reservoir tank 45 and the circulation pump 46.

In the case of this embodiment, three heat generating elements 38 having the same configuration are provided inside the container. FIG. 15 illustrates a sectional configuration of one heat generating element 38 among three heat generating elements 38. The heat generating element 38 is formed in a bottomed cylindrical shape and includes a hollow 40 provided therein. The outer peripheral surface of the heat generating element 38 is wound with a heater 39, and can be heated by the heater 39. A permeated-gas recovery path 42 is provided at one end of the heat generating element 38 to communicate with the hollow 40.

The permeated-gas recovery path 42 is configured in which one end thereof is connected to each heat generating element 38 and communicates with the hollow 40 of each heat generating element 38 and the other end is connected to the reservoir tank 45. Further, the permeated-gas recovery path 42 is provided with a vacuum pump 43 and a boost pump 44. Thus, the gas in the hollow 40 of each heat generating element 38 is sucked by the vacuum pump 43 of the permeated-gas recovery path 42, and the gas is sent to the reservoir tank 45 by the boost pump 44. Thus, the hydrogen-based gas in the container 37 is guided to the hollow 40 in the heat generating element 38 by permeating through the outer peripheral surface of the heat generating element 38, and returns to the container 37 again by being recovered into the reservoir tank 45 from the hollow 40 through the permeated-gas recovery path 42.

Thus, in the heat generating device 31, the hydrogen-based gas is also guided to the hollow 40 in the heat generating element 38 when the hydrogen-based gas circulates through the hydrogen-based gas circulation path 37a, the hydrogen is occluded in heat generating element 38, and the hydrogen-based gas circulates through the permeated-gas recovery path 42. Thus, the heat generating device 31 generates excess heat equal to or higher than the heating temperature with the heat generating element 38 by heating the heat generating element 38 with the heater 39 while allowing the hydrogen-based gas to permeate through the heat generating element 38 (to be described below).

(8-2) Configuration of Permeation-Type Heat Generating Element

Figure 16A:
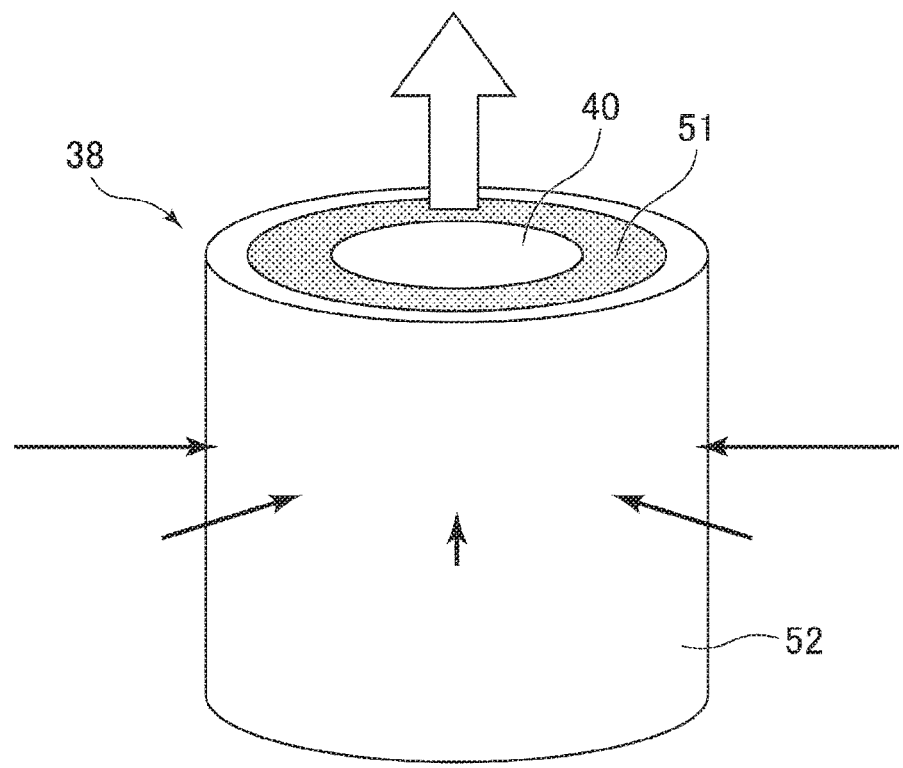
FIG. 16A is a schematic diagram illustrating a configuration of a permeation-type heat generating element.
Figure 16B:
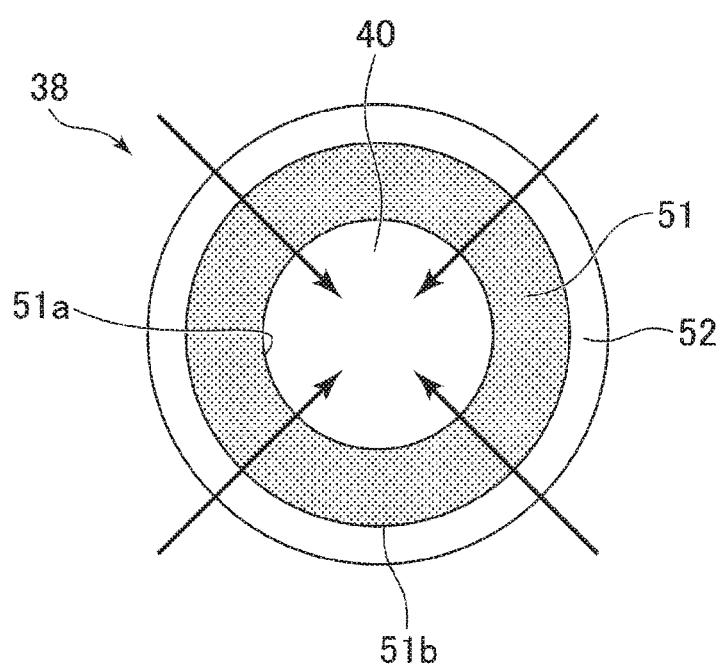
FIG. 16B is a sectional view illustrating a horizontal sectional configuration of the heat generating element.

As illustrated in FIGS. 16A and 16B, the heat generating element 38 is formed in a bottomed cylindrical shape and includes a base 51 having a hollow 40 provided therein and surrounded by an inner peripheral surface 51a thereof and a multilayer film 52 provided on a surface 51b of the base 51. The base 51 is made of hydrogen storage metals, hydrogen storage alloys, or proton conductors, and has a porous structure. Since the base 51 has a mechanical strength capable of supporting the multilayer film 52 on the surface and is porous, the hydrogen-based gas, which has permeated through the multilayer film 52, can permeate to the hollow 40.

In FIGS. 16A and 16B, the bottomed cylindrical base 51 is illustrated, but the base may be formed in a bottomed square shape or a bottomed polygonal cylindrical shape. Further, a mesh-like base may be used; however, when the porous base 51 is used, the hydrogen can reliably permeate into the base 51 and the hydrogen can be rapidly occluded in the base 51.

Figure 17:
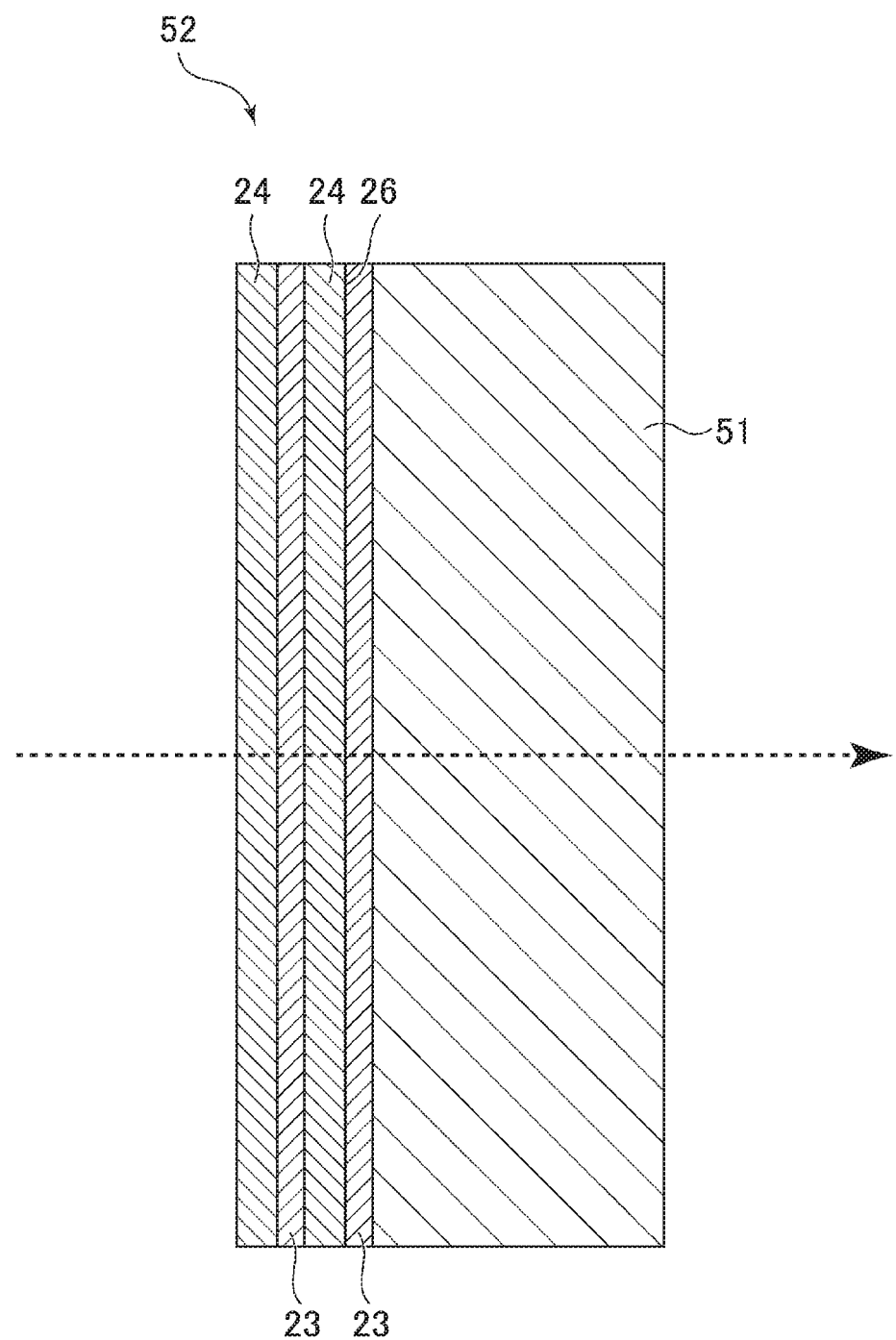
FIG. 17 is a sectional view illustrating a sectional configuration of the heat generating element.

The multilayer film 52 has the same configuration as the multilayer film 25 described above. For example, as illustrated in FIG. 17, the multilayer film 52 is formed by alternately stacking a first layer 23 made of a hydrogen storage metal or a hydrogen storage alloy and a second layer 24 made of a hydrogen storage metal, a hydrogen storage alloy, or ceramics different from that of the first layer 23, and an a heterogeneous material interface 26 can be formed between the first layer 23 and the second layer 24. For example, the first layer 23 is preferably made of any one of Ni, Pd, Cu, Cr, Fe, Mg, Co, and alloys thereof. The second layer 24 is preferably made of any one of Ni, Pd, Cu, Cr, Fe, Mg, Co, alloys thereof, and SiC. Since the first layer 23 and the second layer 24 have a thickness of less than 1000 nm and the multilayer film 52 is thin, the hydrogen-based gas can permeate through the multilayer film 52.

Since the first layer 23 and the second layer 24 are the same as the above-described "(3) Heat generating element", detailed description will not be presented. In addition, since the multilayer film according to another embodiment may be a multilayer film in which the third layer is stacked in addition to the first layer and the second layer or a multilayer film in which the fourth layer is stacked in addition to the first layer, the second layer, and the third layer, and is the same as the above-described "(6) Multilayer Film of Another Embodiment", detailed description will not be presented herein.

(8-3) Operational Effects

In the above configuration, the heat generating device 31 is configured such that the heat generating element 38, which includes the base 51 made of the hydrogen storage metal, the hydrogen storage alloy, or the proton conductor and having the hollow 40 provided therein and the multilayer film 52 provided on the surface 51b of the base 51, is provided inside the container. The heat generating element 38 is provided with the multilayer film 52 formed by stacking the first layer 23, which is made of the hydrogen storage metal or the hydrogen storage alloy and has a layer shape with the thickness of less than 1000 nm, and the second layer 24 which is made of the hydrogen storage metal, the hydrogen storage alloy, or the ceramics different from that of the first layer 23 and has a layer shape with the thickness of less than 1000 nm.

The heat generating device 31 is configured such that the hydrogen-based gas in the container permeates into the heat generating element 38, the hydrogen-based gas is guided to the hollow 40 in the heat generating element 38, and thus the hydrogen is occluded in the heat generating element 38. Further, the heat generating device 31 is configured to heat the heat generating element 38 with the heater 39 while allowing the hydrogen-based gas in the container to permeate through the heat generating element 38. Thus, the heat generating device 31 can generate excess heat equal to or higher than the heating temperature by allowing the hydrogen to permeate through the heterogeneous material interface 26 between the first layer 23 and the second layer 24 in a manner of quantum diffusion. Accordingly, the heat generating device 31 can generate excess heat by allowing the hydrogen to permeate through the first layer 23 and the second layer 24 of the multilayer film 52.

(9) Heat Generating Device Using Electrolyte

Figure 18:
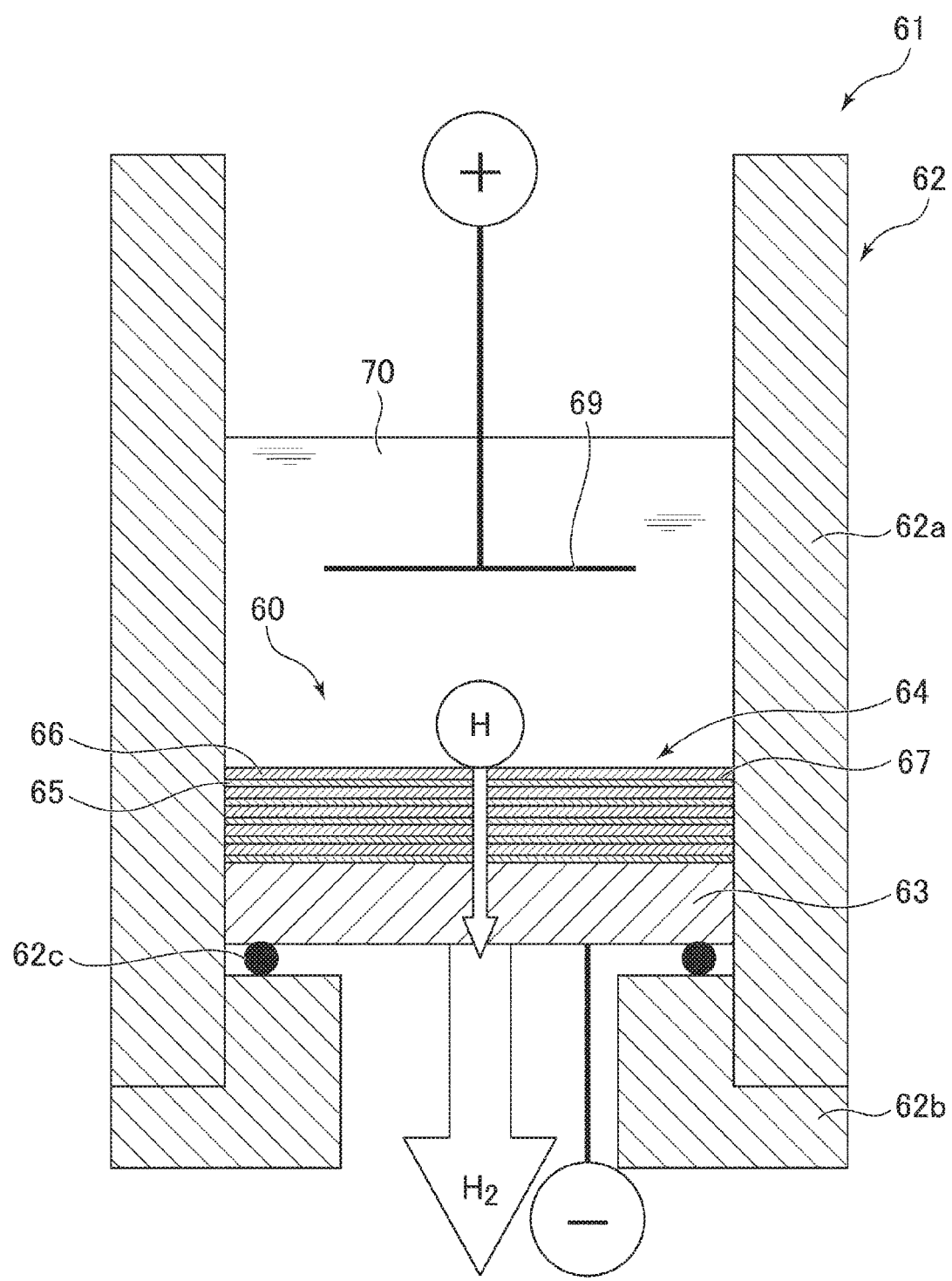
FIG. 18 is a schematic diagram illustrating a configuration a heat generating device using an electrolyte.

FIG. 18 illustrates a heat generating device 61 using an electrolyte 70. The heat generating device 61 includes a container 62 in which the electrolyte 70 contributing to heat generation is stored inside the container, and has a configuration in which a heat generating element 60 is provided as a bottom of the container 62. In the heat generating device 61, an electrode 69 is immersed in the electrolyte 70. The heat generating device 61 includes an electrode control unit (not illustrated), and the electrode control unit can generate hydrogen by electrolyzing the electrolyte 70 using the electrode 69 in the electrolyte 70 as an anode and the heat generating element 60 as a cathode. The electrolyte 70 is a solution in which NaOH or $C_3NO_3$ is contained in heavy water and/or light water, for example.

Here, the container 62 includes a cylindrical wall portion 62a and a support base 62b provided at a lower end of the wall portion 62a. The support base 62b is formed, for example, in a thick cylindrical shape, includes a spacer 62c on an upper surface protruding from an inner peripheral surface of the wall portion 62a, and has a configuration in which a heat generating element 60 is provided via the spacer 62c. The heat generating element 60 has an outer shape formed corresponding to the shape of the inner peripheral surface of the wall portion 62a, and is provided on the inner peripheral surface of the wall portion 62a as a bottom of the container 62. Thus, the electrolyte 70 can be stored in a region surrounded by the wall portion 62a and the heat generating element 60, the wall portion 62a being used as a side surface and the heat generating element 60 being used as a bottom surface.

The heat generating element 60 includes a base 63 made of hydrogen storage metals, hydrogen storage alloys, or proton conductors and a multilayer film 64 provided on a surface of the base 63 and immersed in the electrolyte 70. In the heat generating device 61, since a hollow region of the support base 62b is in a vacuum state, a back surface of the base 63 is exposed to a vacuum space.

The multilayer film 64 has the same configuration as the multilayer film 25 described above. For example, the multilayer film 64 is formed by alternately stacking a first layer 65 made of hydrogen storage metals or hydrogen storage alloys and a second layer 66 made of hydrogen storage metals, hydrogen storage alloys, or ceramics different from that of the first layer 65, and a heterogeneous material interface 67 can be formed between the first layer 65 and the second layer 66. For example, the first layer 65 is preferably made of any one of Ni, Pd, Cu, Cr, Fe, Mg, Co, and alloys thereof. The second layer 66 is preferably made of any one of Ni, Pd, Cu, Cr, Fe, Mg, Co, alloys thereof, and SiC.

Since the first layer 65 and the second layer 66 are the same as the above-described "(3) Heat generating element", detailed description will not be presented. In addition, since the multilayer film according to another embodiment may be a multilayer film in which the third layer is stacked in addition to the first layer and the second layer or a multilayer film in which the fourth layer is stacked in addition to the first layer, the second layer, and the third layer, and is the same as the above-described "(7) Multilayer Film of Another Embodiment", detailed description will not be presented herein.

In the above configuration, the heat generating device 61 is configured to include the heat generating element 60, which includes the base 63 made of the hydrogen storage metal, the hydrogen storage alloy, or the proton conductor and is provided as the bottom of the container 62 with the back surface exposed to the vacuum space and the multilayer film 64 provided on the surface of the base 63 and immersed in the electrolyte 70. The heat generating element 60 is provided with the multilayer film 64 formed by stacking the first layer 65, which is made of the hydrogen storage metal or the hydrogen storage alloy and has a layer shape with the thickness of less than 1000 nm, and the second layer 66 which is made of the hydrogen storage metal, the hydrogen storage alloy, or the ceramics different from that of the first layer 65 and has a layer shape with the thickness of less than 1000 nm.

In the heat generating device 61, the electrolyte 70 is electrolyzed using the electrode 69 immersed in the electrolyte 70 as an anode and the heat generating element 60 as a cathode (step of hydrogen generation), and water contained in the electrolyte 70 is separated into hydrogen and oxygen, thereby a part of the generated hydrogen permeates through the heat generating element 60. That is, in the heat generating element 60, hydrogen (deuterium or protium) permeates toward the base 63 whose back surface is in the vacuum space from the multilayer film 64 which is a high-density hydrogen side where the electrolyte 70 is present. Thus, the heat generating device 61 can generate excess heat by allowing the hydrogen to permeate through the heterogeneous material interface 67 between the first layer 65 and the second layer 66 in a manner of quantum diffusion. Accordingly, the heat generating device 61 can generate excess heat by allowing the hydrogen to permeate through the first layer 65 and the second layer 66 of the multilayer film 64.

(10) Relation Between Thickness Ratio of Each Layer of Multilayer Film and Excess Heat Using a multilayer film manufactured by stacking a first layer made of Cu and a second layer made of Ni on a base made of Ni, a relation between a thickness ratio of the first layer and the second layer and excess heat was investigated. Hereinafter, the thickness ratio of each layer of the multilayer film is described as Ni:Cu.

Seven types of heat generating elements including a multilayer film manufactured under the same conditions as a multilayer film 25d of Example 4 illustrated in FIG. 12A except for Ni:Cu were prepared as Examples 6 to 12. In each of Examples 4 and 6 to 12, Ni:Cu is 7:1, 14:1, 4.33:1, 3:1, 5:1, 8:1, 6:1, and 6.5:1. In Examples 4 and 6 to 12, the thickness of the entire multilayer film was almost the same. In each of the multilayer films of Examples 4 and 6 to 12, the stacking configuration of the first layer and the second layer is repeatedly stacked. In Examples 4 and 6 to 12, the number of stacking configurations of the multilayer films (hereinafter, referred to as the number of layers of multilayer films) was 5. Using each of the heat generating elements of Examples 4 and 6 to 12, eight types of heat generating structures illustrated in FIG. 2 were manufactured. As illustrated in FIG. 1, each of the heat generating structures was installed in the container 2 of the heat generating device 1.

Figure 19:
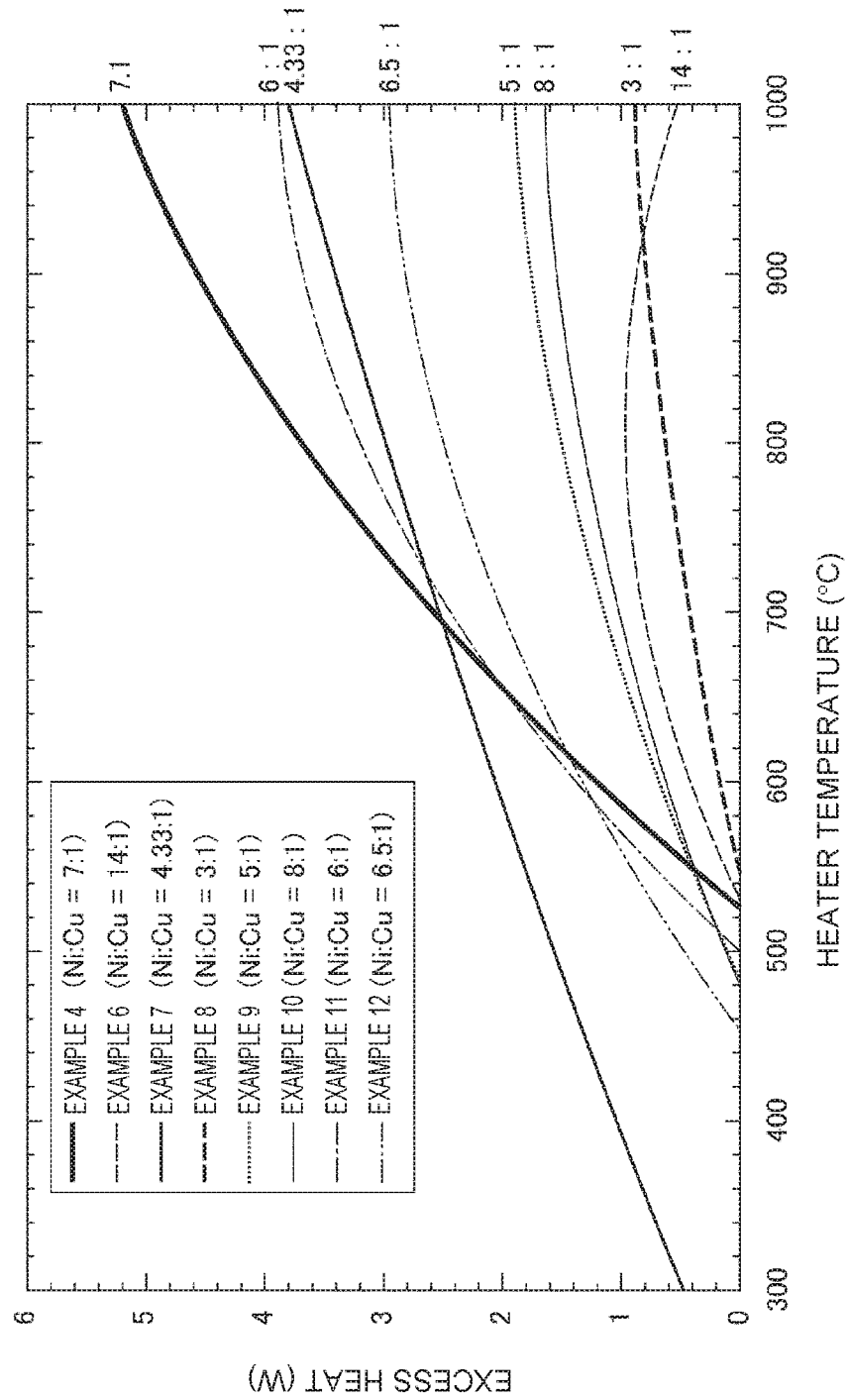
FIG. 19 is a graph illustrating a relation between a thickness ratio of each layer of a multilayer film and excess heat.

In the heat generating device 1 provided with the eight types of heat generating structures in the container 2, a hydrogen occluding step and heating step were repeated. The input power was 9 W, 18 W, and 27 W with the hydrogen occluding step. Then, the temperature of the heat generating element at the time of each heating step was measured by the thermocouple built in the heater of the heat generating structure. The results are illustrated in FIG. 19. FIG. 19 is a graph obtained by fitting measured data using a predetermined method. In FIG. 19, a heater temperature was indicated on an abscissa, and power of excess heat was indicated on an ordinate. In FIG. 19, Example 4 was expressed as "Ni:Cu=7:1", Example 6 was expressed as "Ni:Cu=14:1", Example 7 was expressed as "Ni:Cu=4.33:1", Example 8 was expressed as "Ni:Cu=3:1", Example 9 was expressed as "Ni:Cu=5:1", Example 10 was expressed as "Ni:Cu=8:1", Example 11 was expressed as "Ni:Cu=6:1", and Example 12 was expressed as "Ni:Cu=6.5:1".

From FIG. 19, it was confirmed that all of the heat generating elements of Examples 4 and 6 to 12 generated excess heat. Comparing heat generating elements of Examples 4 and 6 to 12 with each other at the heater temperature of 700° C. or higher, it can be seen that the largest excess heat is generated in Example 4. It can be seen that the heat generating element of Example 7 generates excess heat over a wide range of heater temperature of 300° C. or higher and 1000° C. or lower, compared with the heat generating elements of Examples 4, 6, and 8 to 12. In Examples 4 and 7 to 12 where Ni:Cu of the multilayer film is 3:1 to 8:1, it can be seen that the excess heat increases as the heater temperature increases. In Example 6 where Ni:Cu of the multilayer film is 14:1, it can be seen that the excess heat decreases when the heater temperature is 800° C. or higher. As described above, it is thought that the reason why the excess heat does not simply increase with respect to the ratio of Ni and Cu is due to the quantum effect of hydrogen in the multilayer film. From the above, Ni:Cu of the multilayer film is preferably within the range of 3:1 to 14:1, and more preferably within the range of 3:1 to 8:1.

(11) Relation Between Number of Layers of Multilayer Films and Excess Heat

Using a multilayer film manufactured by stacking a first layer made of Cu and a second layer made of Ni on a base made of Ni, a relation between the number of layers of multilayer films and excess heat was investigated.

Eight types of heat generating elements including a multilayer film manufactured under the same conditions as a multilayer film 25d of Example 4 illustrated in FIG. 12A except for the number of layers were prepared as Examples 13 to 20. In Examples 4 and 13 to 20, the number of layers of the multilayer films is 5, 3, 7, 6, 8, 9, 12, 4, and 2, respectively. Using the heat generating element 5b of Example 4 and the heat generating elements of Examples 13 to 20, nine types of heat generating structures illustrated in FIG. 2 were manufactured. As illustrated in FIG. 1, each of the heat generating structures was installed in the container 2 of the heat generating device 1.

Figure 20:
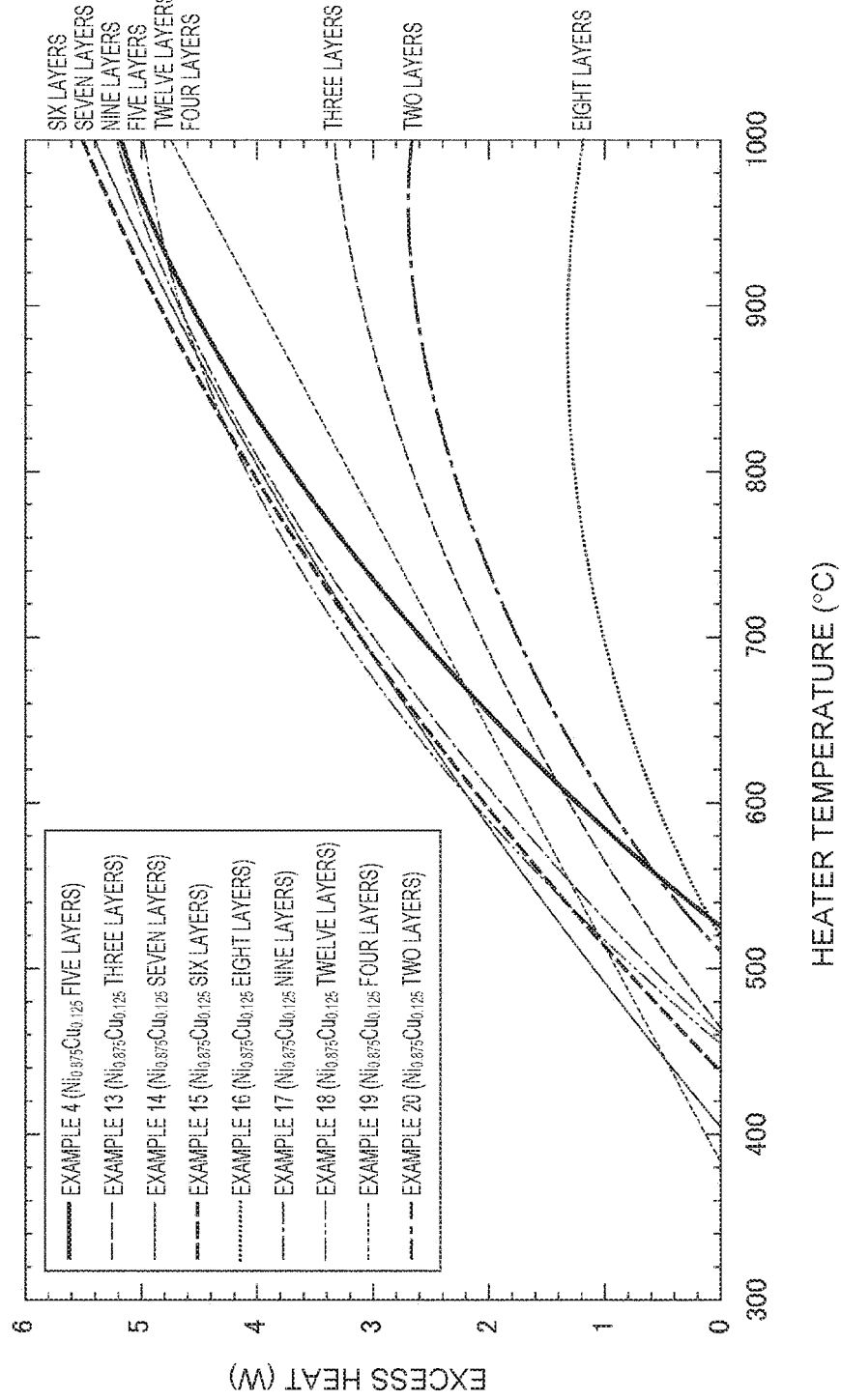
FIG. 20 is a graph illustrating a relation between the number of layers of multilayer films and excess heat.

In the heat generating device 1 provided with the nine types of heat generating structures in the container 2, the temperature of the heat generating element during the heating step was measured by the same method as "(10) Relation between Thickness Ratio of Each Layer of Multilayer Film and Excess Heat" described above. The results are illustrated in FIG. 20. FIG. 20 is a graph obtained by fitting measured data using a predetermined method. In FIG. 20, a heater temperature was indicated on an abscissa, and power of excess heat was indicated on an ordinate. In FIG. 20, based on the thickness of each layer, Example 4 was expressed as "$Ni_{0.875}Cu_{0.125}$; five layers", Example 13 was expressed as "$Ni_{0.875}Cu_{0.125}$; three layers", Example 14 was expressed as "$Ni_{0.875}Cu_{0.125}$; seven layers", Example 15 was expressed as "$Ni_{0.875}Cu_{0.125}$; six layers", Example 16 was expressed as "$Ni_{0.875}Cu_{0.125}$; eight layers", Example 17 was expressed as "$Ni_{0.875}Cu_{0.125}$; nine layers", Example 18 was expressed as "$Ni_{0.875}Cu_{0.125}$; twelve layers", Example 19 was expressed as "$Ni_{0.875}Cu_{0.125}$; four layers", and Example 20 was expressed as "$Ni_{0.875}Cu_{0.125}$; two layers".

From FIG. 20, it was confirmed that all of the heat generating elements of Examples 4 and 13 to 20 generated excess heat. Comparing heat generating elements of Examples 4 and 13 to 20 with each other at the heater temperature of 840° C. or higher, it can be seen that the excess heat is largest in Example 15 in which the number of layers of the multilayer films is 6 and the excess heat is smallest in Example 16 in which the number of layers of the multilayer films is 8. As described above, it is thought that the reason why the excess heat does not simply increase with respect to the number of layers of the multilayer films is because the wavelength of the behavior of the hydrogen wave in the multilayer film is a nanometer order and interferes with the multilayer film. From the above, the number of layers of the multilayer films is preferably within the range of 2 to 12, and more preferably within the range of 4 to 7.

(12) Relation Between Material of Multilayer Film and Excess Heat

Using a multilayer film manufactured by stacking a first layer made of Ni, a second layer made of Cu, and a third layer made of hydrogen storage metals, hydrogen storage alloys, or ceramics different from those of the first layer and the second layer, a relation between a type of material for forming the third layer and excess heat was investigated.

Eight types of heat generating elements including a multilayer film manufactured under the same conditions as a multilayer film 25e of Example 5 illustrated in FIG. 13A except for the type of material for forming the third layer were prepared as Examples 21 to 28. In each of Examples 5 and 21 to 28, the type of material for forming the third layer is CaO, SiC, $Y_2O_3$, TiC, Co, $LaB_6$, ZrC, $TiB_2$, and CaOZrO. Using the heat generating element 5e of Example 5 and the heat generating elements of Examples 21 to 28, nine types of heat generating structures illustrated in FIG. 2 were manufactured. As illustrated in FIG. 1, each of the heat generating structures was installed in the container 2 of the heat generating device 1.

Figure 21:
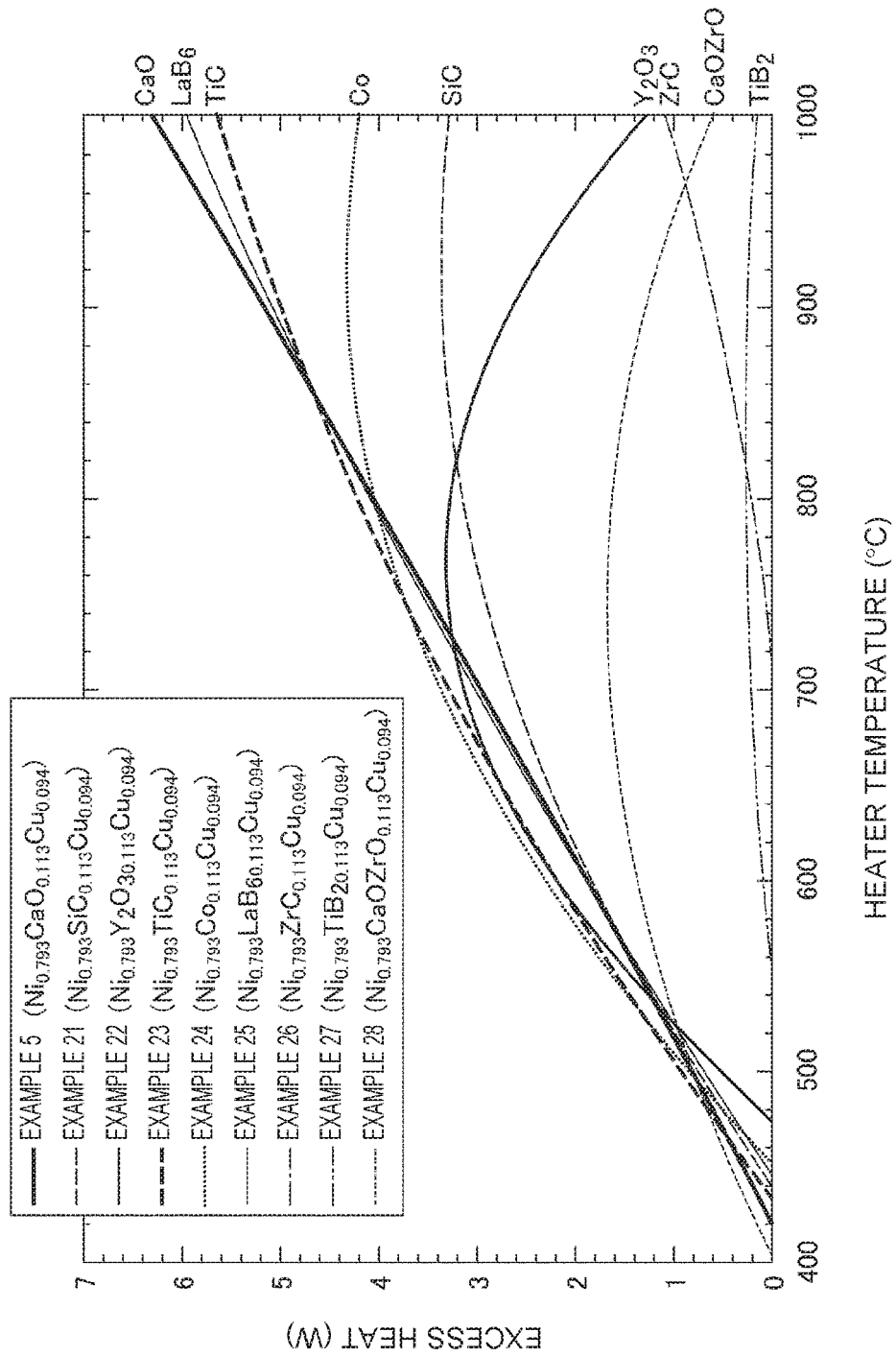
FIG. 21 is a graph illustrating a relation between a material of a multilayer film and excess heat.

In the heat generating device 1 provided with the nine types of heat generating structures in the container 2, the temperature of the heat generating element during the heating step was measured by the same method as "(10) Relation between Thickness Ratio of Each Layer of Multilayer Film and Excess Heat" described above. The results are illustrated in FIG. 21. FIG. 21 is a graph obtained by fitting measured data using a predetermined method. In FIG. 21, a heater temperature was indicated on an abscissa, and power of excess heat was indicated on an ordinate. In FIG. 21, based on the thickness of each layer, Example 5 was expressed as "$Ni_{0.793}CaO_{0.113}Cu_{0.094}$", Example 21 was expressed as "$Ni_{0.793}SiC_{0.113}Cu_{0.094}$", Example 22 was expressed as "$Ni_{0.793}Y_2O_{30.113}Cu_{0.094}$", Example 23 was expressed as "$Ni_{0.793}TiC_{0.113}Cu_{0.094}$", Example 24 was expressed as "$Ni_{0.793}Co_{0.113}Cu_{0.094}$", Example 25 was expressed as "$Ni_{0.793}LaB_{60.113}Cu_{0.094}$", Example 26 was expressed as "$Ni_{0.793}ZrC_{0.113}Cu_{0.094}$", Example 27 was expressed as "$Ni_{0793}TiB_{20.113}Cu_{0.094}$", and Example 28 was expressed as "$Ni_{0.793}CaOZrO_{0.113}Cu_{0.094}$".

From FIG. 21, it was confirmed that excess heat is generated in all of Examples 5 and 21 to 28. In particular, it can be seen that the excess heat is almost linearly increases over a wide range of heater temperature of 400° C. or higher and 1000° C. or lower in Example 5 in which the material for forming the third layer is CaO, Example 23 in which the material is TiC, and Example 25 in which the material is $LaB_6$, compared with other Examples 21, 22, 24, and 26 to 28. The material for forming the third layer of Examples 5, 23, and 25 has a work function smaller than those of other Examples 21, 22, 24, and 26 to 28. From this point, it can be seen that the material for forming the third layer is preferably a material having a small work function. From these results, there is a possibility that the electron density in the multilayer film contributes to the reaction by which excess heat is generated.

(13) Heat Generating Device Using Heat Generating Module

(13-1) Heat Generating Module

Figure 22:
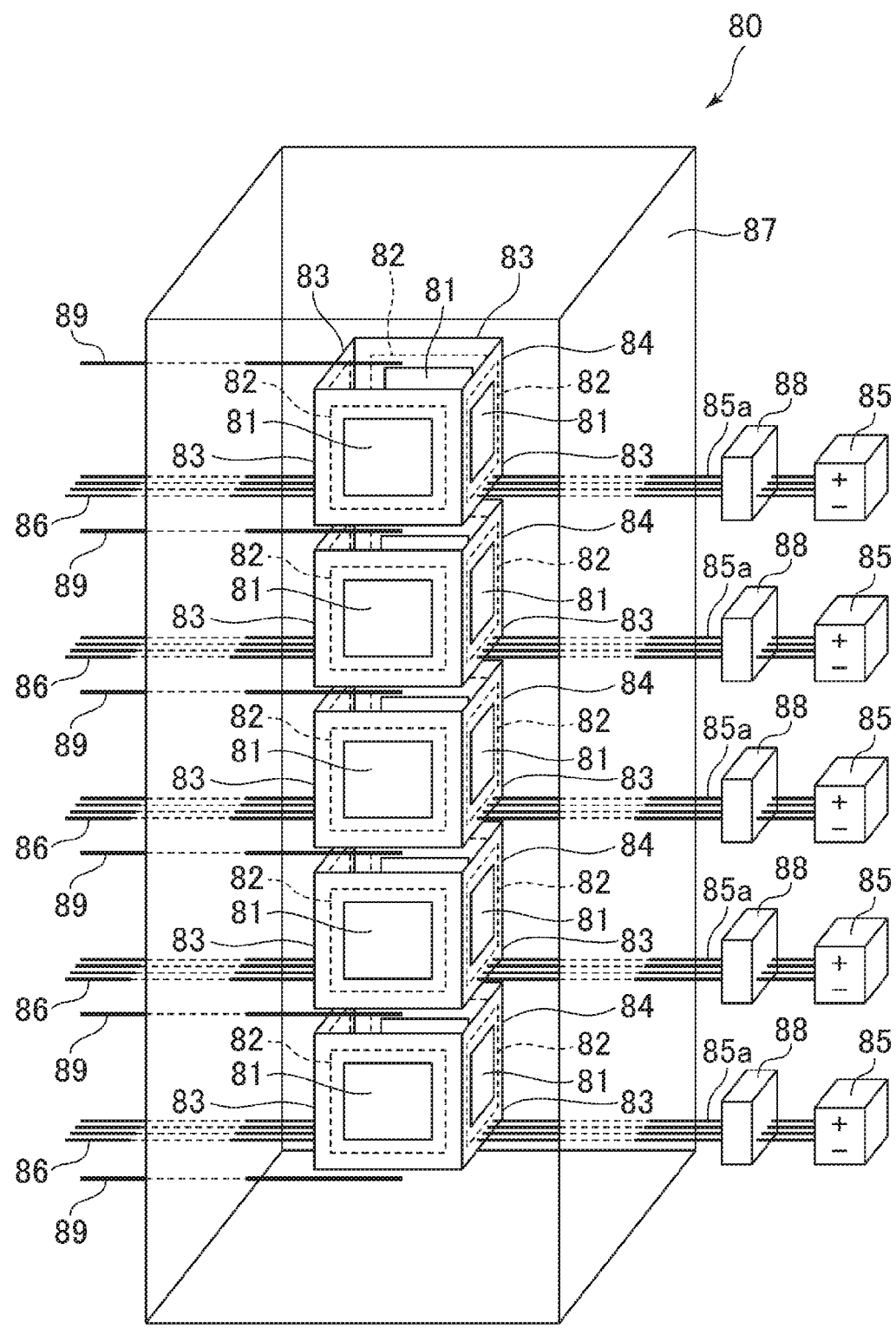
FIG. 22 is a schematic diagram illustrating a configuration of a heat generating module.

A heat generating module 80 will be schematically described with reference to FIG. 22. The heat generating module 80 includes a plurality of heat generating structures 83 including a heat generating element 81 and a heater 82. In this example, the heat generating module 80 includes 20 heat generating structures 83. In the heat generating module 80, one heat generating unit 84 is formed by four heat generating structures 83. That is, the heat generating module 80 includes five heat generating units 84. In addition, the heat generating module 80 includes, in addition to the plurality of heat generating structures 83, a power source 85 that supplies power to the heater 82, a temperature measuring unit 86 that measures a temperature of the heater 82, and a heat reflecting portion 87 that reflects heat generated by the heat generating element 81.

In the heat generating module 80, five heat generating units 84 are provided inside the cylindrical heat reflecting portion 87, and an inner surface of the heat reflecting portion 87 faces an outer surface of each of the heat generating units 84. The heat generating structure 83 is formed in a plate shape and includes the heat generating elements 81 provided on both sides thereof. The heat generating unit 84 is formed in a cylindrical shape and has side surfaces made up of the heat generating structure 83. For this reason, the plurality of heat generating structures 83 are disposed so that first surfaces thereof face each other. Further, the plurality of heat generating structures 83 are disposed so that a second surface faces the heat reflecting portion 87. In the heat generating module 80, therefore, the heat generating elements 81 provided on the first surface of the heat generating structure 83 face each other, and the heat generating element 81 provided on the second surface of the heat generating structure 83 faces the heat reflecting portion 87.

The heat generating element 81 is a heat generating element including various configurations of multilayer films, for example, the above-described heat generating elements 5a to 5e. The heater 82 is, for example, a ceramic heater, and is provided inside the heat generating structure 83. The heater 82 is connected to the power source 85 provided outside the heat reflecting portion 87 via a wiring 85a. The power source 85 is provided for each of the heat generating units 84. One power source 85 is connected to in parallel with four heaters 82 provided in one heat generating unit 84. The wiring 85a is provided with an ammeter-voltmeter 88 that is used to measure power supplied to the heater 82. The wiring 85a is taken out in a right direction of paper in consideration of visibility of the drawing in FIG. 22, but, actually, is taken out from an opening located at a lower part of the heat reflecting portion 87. In FIG. 22, the wiring 85a is indicated by a number of lines corresponding to the number of heaters 82, that is, four lines for one heat generating unit 84.

The heat generating module 80 further includes a temperature measuring unit 89, which measures a temperature of the heat generating unit 84, in addition to the temperature measuring unit 86. In this example, one temperature measuring unit 89 is provided at an upper part of the uppermost heat generating unit 84, one temperature measuring unit is provided at a lower part of the lowermost heat generating unit 84, and one temperature measuring unit is provided between the heat generating units 84. The temperature measuring unit 86 and the temperature measuring unit 89 are, for example, thermocouples. The temperature measuring unit 86 and the temperature measuring unit 89 are taken out in a left direction of paper in consideration of visibility of the drawing in FIG. 22, but, actually, is taken out from the opening located at the lower part of the heat reflecting portion 87. In FIG. 22, the temperature measuring unit 86 is indicated by a number of lines corresponding to the number of heaters 82, that is, four lines for one heat generating unit 84.

The heat reflecting portion 87 is formed of a material that reflects heat generated by the heat generating element 81. Examples of the materials of the heat reflecting portion 87 include molybdenum, aluminum, zirconium, and platinum. In FIG. 22, the heat reflecting portion 87 is formed in a rectangular cylindrical shape by four reflecting plates. The heat reflecting portion 87 may be one in which the reflecting plates are integrally formed, or may be one in which the reflecting plates are formed separately. The shape of the heat reflecting portion 87 is not limited to the rectangular cylindrical shape, and may be appropriately designed in a polygonal cylindrical shape, a cylindrical shape, an elliptical cylindrical shape, or the like.

Figure 23:
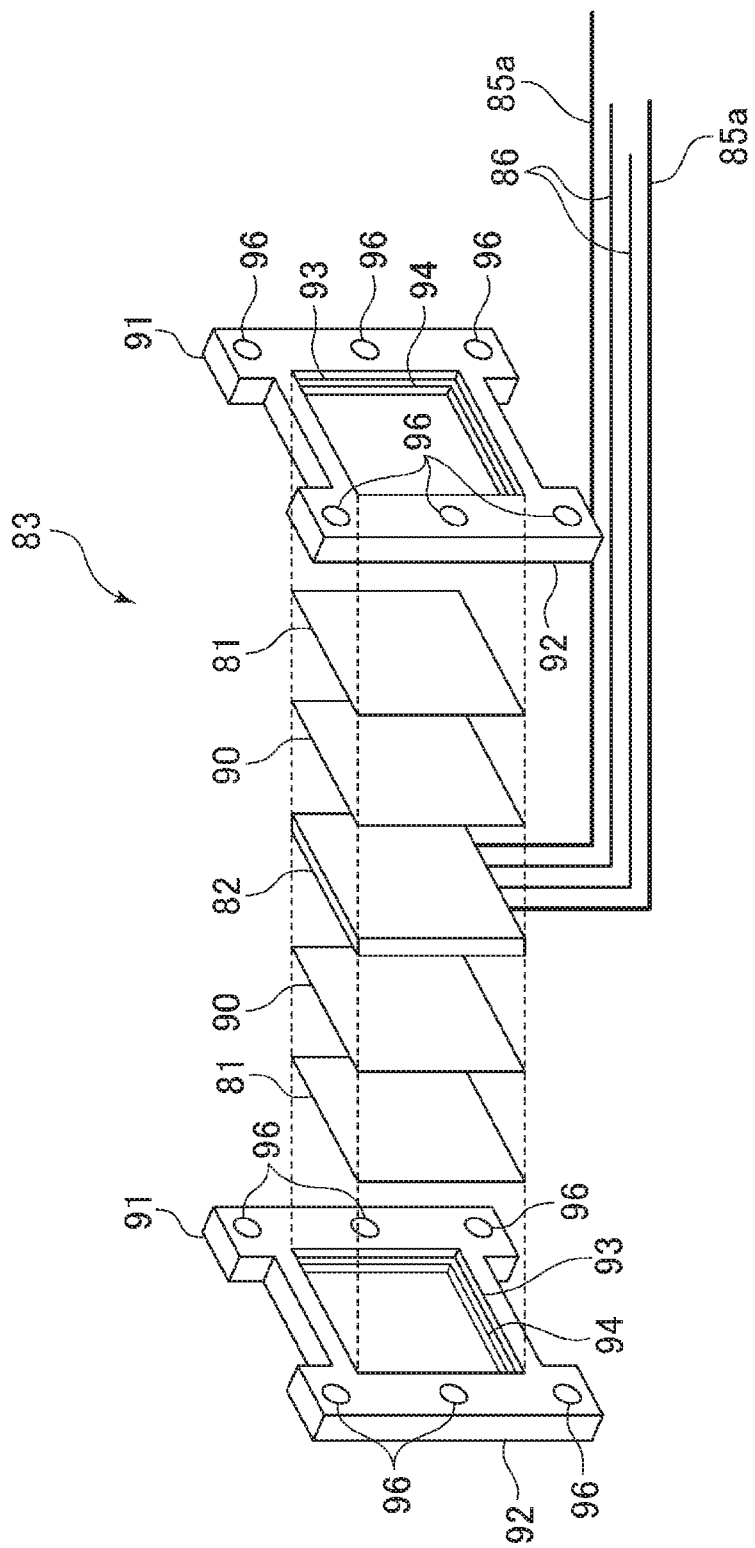
FIG. 23 is an exploded view illustrating a configuration of a heat generating structure used for the heat generating module.

A structure of the heat generating structure 83 will be described in detail with reference to FIG. 23. The heat generating structure 83 includes, in addition to the heat generating element 81 and the heater 82, a substrate 90 provided between the heat generating element 81 and the heater 82, and a holder 91 that holds the heat generating element 81, the heater 82, and the substrate 90. In FIG. 23, the heat generating structure 83 has a configuration in which the substrate 90, the heat generating element 81, and the holder 91 are sequentially disposed on both sides of the heater 82, and is formed in a manner that the holders 91 are screwed, for example. In FIG. 23, each of the wiring 85a and the temperature measuring unit 86 is indicated by two lines.

The substrate 90 is formed of, for example, $SiO_2$ in a plate shape. The substrate 90 is a spacer that is provided on both surfaces of the heater 82 and prevents contact between the heat generating element 81 and the heater 82.

The holder 91 is formed of, for example, ceramics in a plate shape. The holder 91 includes an opening 93 provided at the center of a flat plate 92 and a stepped portion 94 provided in the opening 93. The flat plate 92 is formed in a substantially rectangular shape in a plan view, and a notch is provided at end portions facing each other with the opening 93 interposed therebetween. The flat plate 92 is provided with screw holes 96. The heat generating element 81 is disposed in the opening 93. The heat generating element 81 disposed in the opening 93 is positioned by the stepped portion 94 and is prevented from falling off. Thus, the heat generating element 81 is held by the holder 91 in a state of being exposed from the opening 93.

Figure 24:
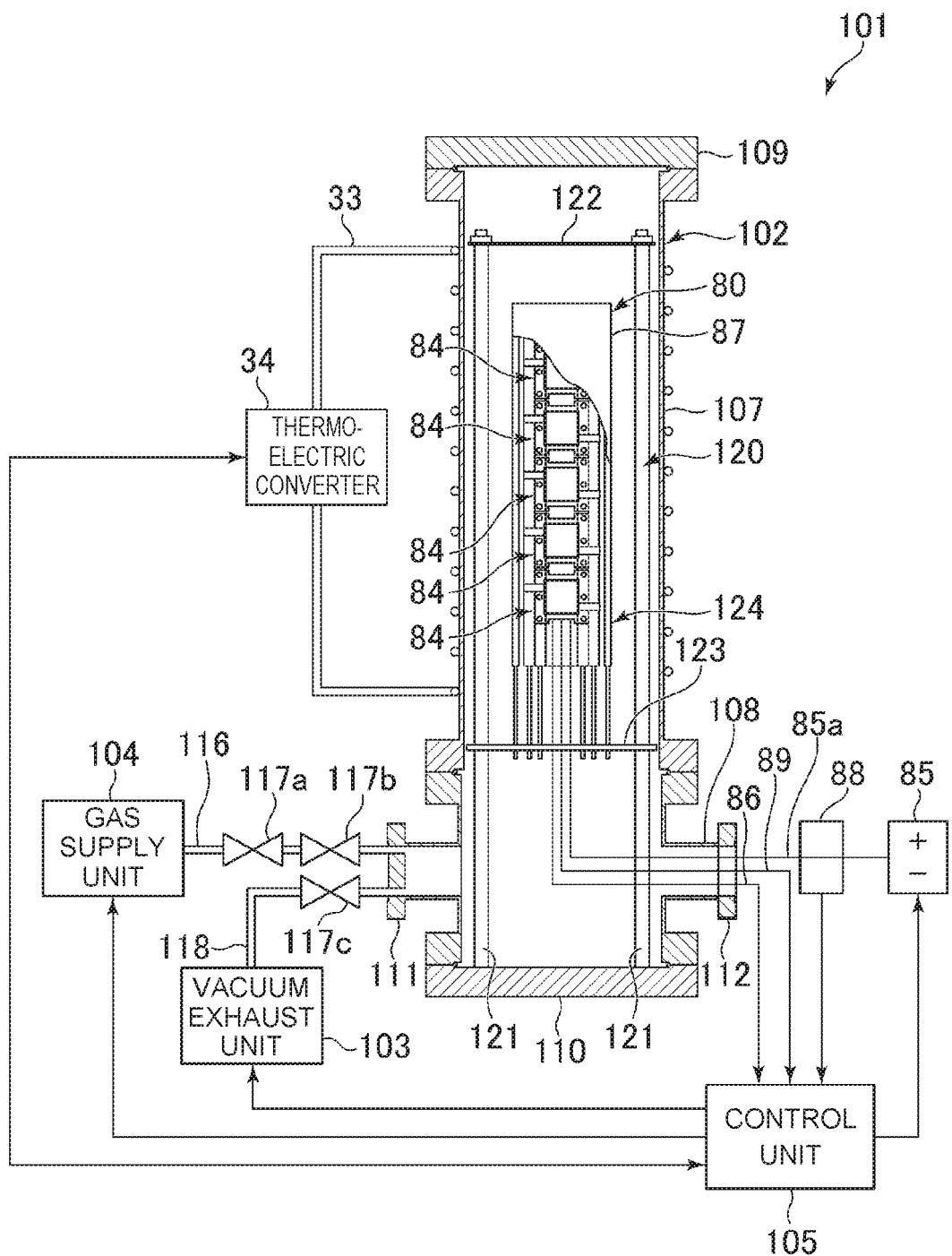
FIG. 24 is a schematic diagram illustrating a configuration of a heat generating device using the heat generating module.

(13-2) Overall Configuration of Heat Generating Device Using Heat Generating Module As illustrated in FIG. 24, a heat generating device 101 includes a heat generating module 80, a container 102 that accommodates the heat generating module 80, a vacuum exhaust unit 103 that vacuum-exhausts the inside of the container 102, a gas supply unit 104 that supplies a hydrogen-based gas into the container 102, and a control unit 105 that controls an output of excess heat. Although the heat generating device 101 will be described below, the heat generating device 101 is an example of a heat generating device using the heat generating module 80, and arrangement of each member, extraction of wiring, and the like are not limited. In FIG. 24, a power source 85, a wiring 85a, an ammeter-voltmeter 88, a temperature measuring unit 86, and a temperature measuring unit 89 are simply illustrated in consideration of visibility of the drawing.

The container 102 is formed of stainless, for example. The container 102 includes a cylindrical first container main body 107, a cylindrical second container main body 108 communicating with the first container main body 107, a lid 109 provided on the first container main body 107, and a bottom 110 provided on the second container main body 108.

A tubular circulation path 33 is provided on an outer periphery of the container 102. A fluid heated by heat generated by the heat generating module 80 circulates inside the circulation path 33. The circulation path 33 is provided with a thermoelectric converter 34 that thermoelectrically converts the heat of the heated fluid.

The first container main body 107 accommodates the heat generating module 80 therein. The lid 109 is provided at one end of the first container main body 107 via a sealing material (not illustrated). The other end of the first container main body 107 is connected to one end of the second container main body 108. A sealing material (not illustrated) is provided at a connection portion between the first container main body 107 and the second container main body 108. At the other end of the second container main body 108, the bottom 110 is provided via a sealing material (not illustrated).

On side surfaces of the second container main body 108, a first connection portion 111 and a second connection portion 112 are provided. The first connection portion 111 connects the inside of the container 102 and the gas supply unit 104 via a hydrogen-based gas introduction path 116. The hydrogen-based gas introduction path 116 is provided with regulating valves 117a and 117b. Although not illustrated, the gas supply unit 104 includes a tank that accommodates, for example, a hydrogen-based gas and a pump that sends the hydrogen-based gas accommodated in the tank to the hydrogen-based gas introduction path 116. Further, the first connection portion 111 connects the inside of the container 102 and the vacuum exhaust unit 103 via an exhaust path 118. The exhaust path 118 is provided with a regulating valve 117c. The vacuum exhaust unit 103 includes, for example, a dry pump.

The second connection portion 112 is used to take out the wiring 85a, the temperature measuring unit 86, and the temperature measuring unit 89 to the outside of the container 102 via a sealing material (not illustrated). The wiring 85a taken out from the second connection portion 112 is connected to the power source 85 via the ammeter-voltmeter 88. The temperature measuring unit 86 and the temperature measuring unit 89 taken out from the second connection portion 112 are electrically connected to the control unit 105.

The control unit 105 is electrically connected to the power source 85, the ammeter-voltmeter 88, the vacuum exhaust unit 103, the gas supply unit 104, and the thermoelectric converter 34. The control unit 105 adjusts the input power of the heater 82, the supply amount of the hydrogen-based gas, the pressure in the container 102, and the like to control the output of the excess heat. For example, the control unit 105 selectively turns ON and OFF five power sources 85 to increase the output of the excess heat. In addition, the control unit 105 may feedback the measurement results, for example, the temperature measured by the temperature measuring unit 86 or the temperature measuring unit 89, the power measured by the ammeter-voltmeter 88, and the power converted by the thermoelectric converter 34, for control of the output of the excess heat.

A support portion 120 is provided inside the container 102 to support the heat generating module 80. The support portion 120 includes a support portion main body 121 having one end fixed to the bottom 110, a top plate 122 provided at the other end of the support portion main body 121, a fixing base 123 provided in the middle of the support portion main body 121, and a support pillar portion 124 fixed to the fixing base 123. The support portion main body 121 extends from the bottom 110 to the vicinity of the lid 109. The fixing base 123 is disposed in the vicinity of the connection portion between the first container main body 107 and the second container main body 108 in the support portion main body 121.

Figure 25:
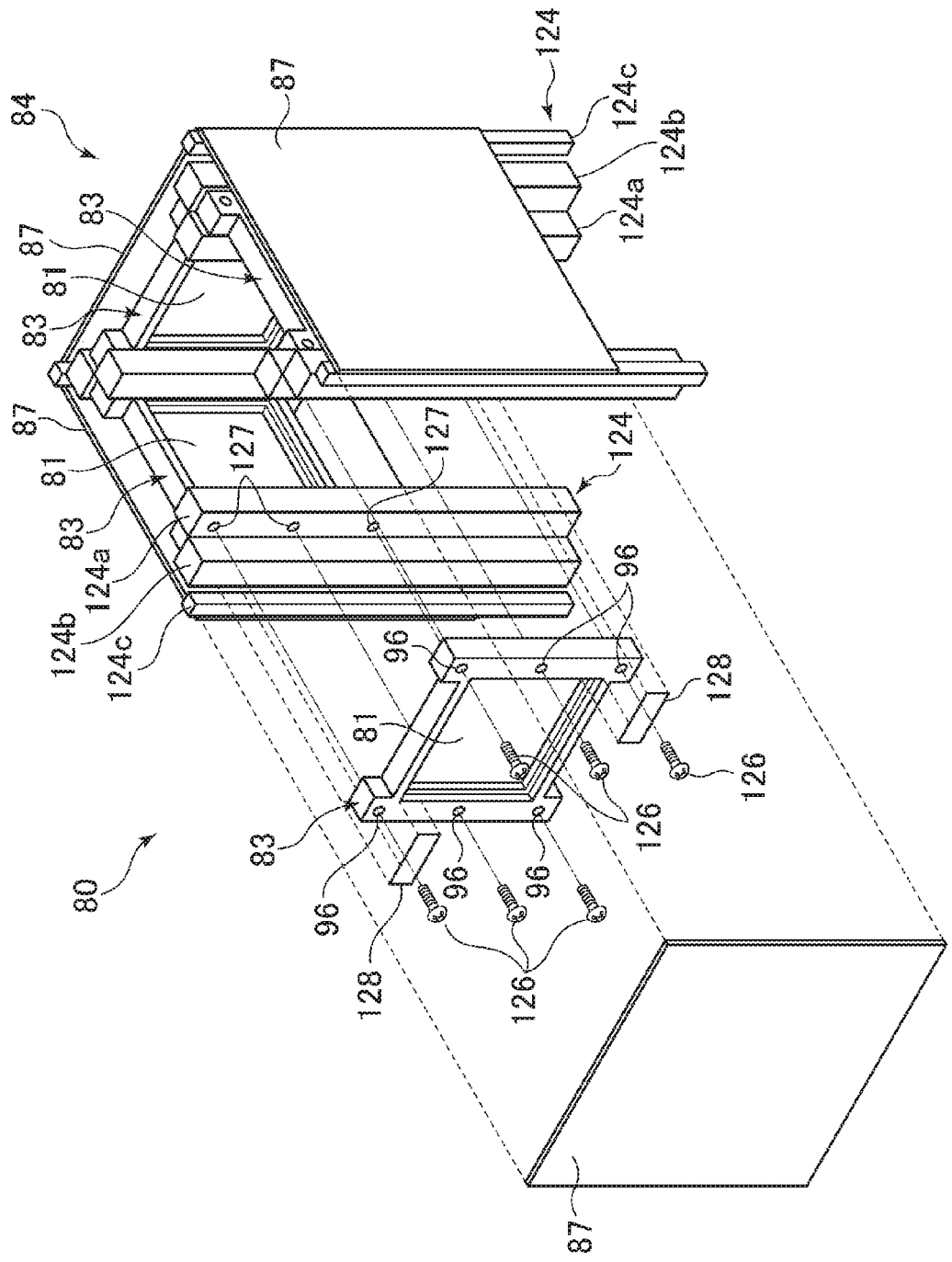
FIG. 25 is an enlarged exploded view illustrating a configuration of a main part of the heat generating device using the heat generating module.

As illustrated in FIG. 25, the heat generating module 80 is supported by the support pillar portion 124. FIG. 25 illustrates a portion of one heat generating unit 84 of the heat generating module 80. The support pillar portion 124 includes a first support pillar 124a, a second support pillar 124b, and a third support pillar 124c. The number of each of the first to third support pillars 124a to 124c is four. The four first support pillars 124a are disposed at equal intervals. The four second support pillars 124b are equally spaced from each other, and are disposed outside the first support pillars 124a. The four third support pillars 124c are equally spaced from each other, and are disposed outside the second support pillars 124b.

The heat generating structure 83 is fixed to the first support pillar 124a. For example, the heat generating structure 83 is fixed to the first support pillar 124a using a screw 126 in a state where a screw hole 96 of the heat generating structure 83 is aligned with a screw hole 127 provided in the first support pillar 124a. The fixing between the first support pillar 124a and the heat generating structure 83 is reinforced using a pressing member 128. The pressing member 128 is provided on the second support pillar 124b and reliably prevents the heat generating structure 83 from falling off. The heat reflecting portion 87 is fixed to the third support pillar 124c. The heat reflecting portion 87 is fixed to the third support pillar 124c by screwing, for example.

(13-3) Operational Effects

In the above configuration, the heat generating device 101 uses the heat generating module 80 made up of the plurality of heat generating structure 83. Since the heat generating module 80 is disposed such that the heat generating elements 81 provided on first surfaces of the heat generating structures 83 face each other, the heat generating element 81 is heated by the heat of the heater 82 and the heat generated by another opposing heat generating element 81. As a result, the heat generating device 101 can reduce the input power required to maintain a desired temperature.

In addition, since the heat generating module 80 is disposed such that the heat generating element 81 provided on the second surface of the heat generating structure 83 faces the heat reflecting portion 87, the heat generating element 81 is heated by the heat of the heater 82 and the heat reflected by the heat reflecting portion 87. As a result, the heat generating device 101 can further reduce the input power required to maintain a desired temperature.

(13-4) Verification Test

A verification test was performed on the above-described input power reduction effect. In the verification test, a heat generating structure 83 was manufactured using the heat generating element 5e including the multilayer film 25e of Example 5. A heat generating module 80 was manufactured using five heat generating units 84 made up of the heat generating structure 83, and was accommodated in the container 102.

In a verification test, first, all the five power sources 85 corresponding to the five heat generating units 84 were turned ON, and the input power was increased stepwise while measuring the temperature. After a predetermined time has elapsed since the power sources 85 were turned ON, only the power source 85 corresponding to the third heat generating unit 84 among the five heat generating units 84 was kept in the ON state, and the other four power sources 85 were turned OFF. The input power required to a desired temperature was compared between when all the five power sources 85 were turned ON and when only the power source 85 corresponding to the third heat generating unit 84 was turned ON.

Figure 26:
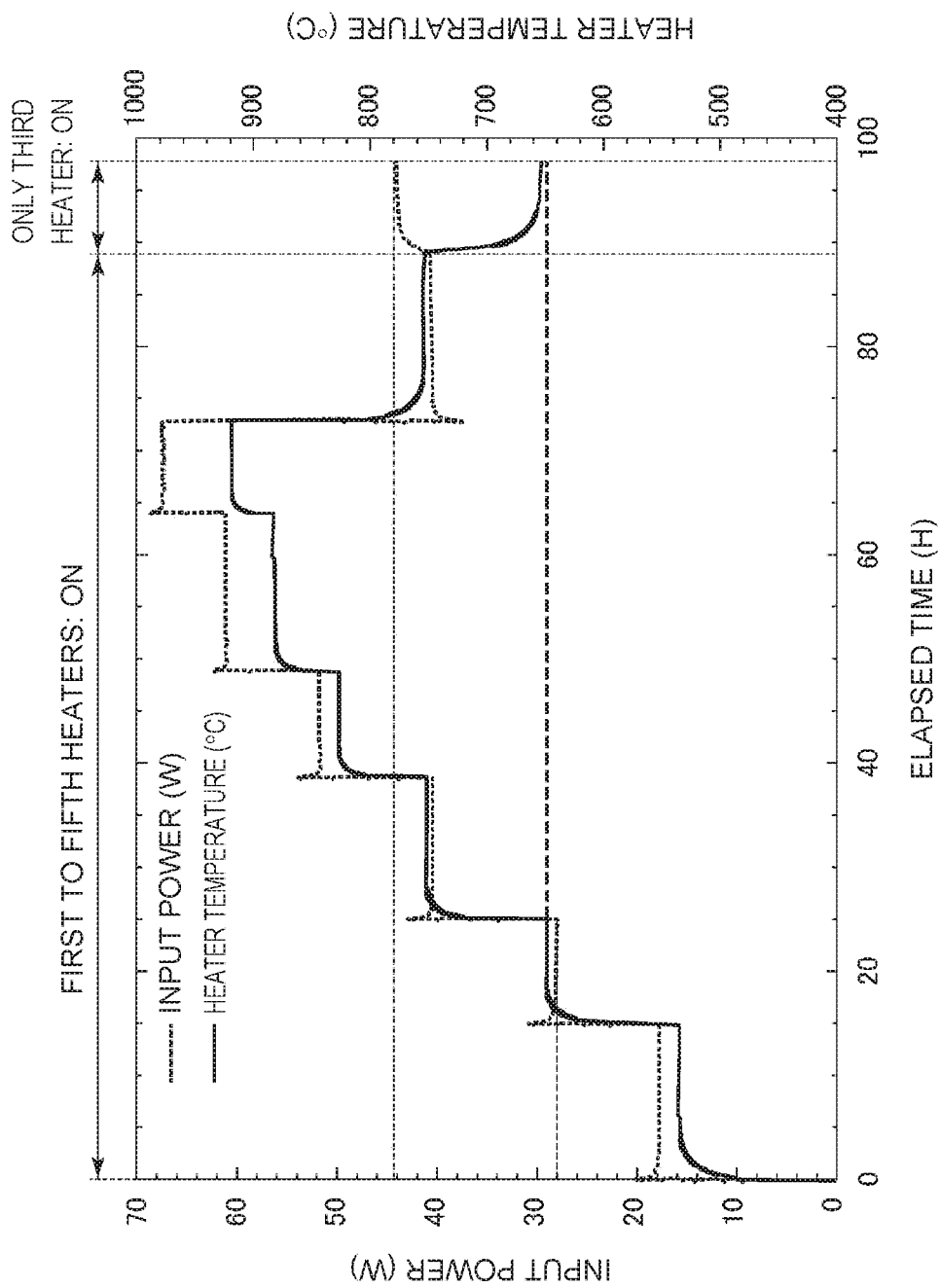
FIG. 26 is a graph illustrating results of a verification test of an input power reduction effect in the heat generating device using the heat generating module.

The results are illustrated in FIG. 26. In FIG. 26, an abscissa indicates an elapsed time (H), a left first ordinate indicates input power (W), and a right second ordinate indicates a heater temperature (° C.). The input power (W)

is an average value of the power supplied to four heaters 82 of the third heat generating unit 84. The heater temperature (° C.) is an average value of the temperatures of four heaters 82 of the third heat generating unit 84. In FIG. 26, a period in which all of the five power sources 85 are turned ON is expressed as "first to fifth heaters: ON", and a period in which only the power source 85 corresponding to the third heat generating unit 84 is turned ON is expressed as "only third heater: ON". It can be seen from FIG. 26 that, in order to keep the heater temperature at 650° C., 44.1 W of input power is required when only one power source 85 is turned ON; and 27.8 W of input power is required when all the five power sources 85 are turned ON. From this point, it is confirmed that when all the five power sources 85 are turned ON, the same temperature can be maintained with 0.63 times the input power, compared with when only one power source 85 is turned ON.

(14) Modification Example

The heat generating device according to each of the above embodiments is an example of the heat generating device including the heat generating element having the multilayer film having various configurations described above, and is not limited thereto.

The heat generating device 1 may include one heat generating element 5 or three or more heat generating elements 5 without being limited to include two heat generating elements 5. The heat generating device 1 including one heat generating element 5 preferably further includes a heat reflecting portion 87. The heat reflecting portion 87 is provided inside a container 2, and is disposed to face the heat generating element 5. The heat generating element 5 is heated by heat of a heater 6 and heat reflected by the heat reflecting portion 87. As a result, the heat generating device 1 reduces the input power required to maintain a desired temperature.

In the heat generating device 1, the arrangement of the heat generating element 5 and the arrangement of the heater 6 are not particularly limited. For example, two heat generating elements 5 may be placed at intervals to face each other, and the heater 6 may be disposed along a direction in which the heat generating elements 5 are arranged. That is, the heat generating device 1 may include a plurality of heat generating elements 5 arranged at intervals and a heater 6 provided along the arrangement direction of the heat generating elements 5. The arrangement direction of the heat generating elements 5 is, for example, a direction orthogonal to the surface of the heat generating elements 5. In this example, the heat generating element 5 is heated by the heat of the heater 6 and the heat generated by another opposing heat generating element 5. As a result, the heat generating device 1 reduced the input power required to maintain a desired temperature. Even when three or more heat generating elements 5 are placed at intervals to face each other, three or more heat generating elements 5 can be heated by one heater 6 by the arrangement of the heater 6 along the arrangement direction of the heat generating elements 5.

The heat generating device 31 may further include a heat reflecting portion 87. The heat reflecting portion 87 is provided inside the container 37, and is disposed to face the heat generating element 38. When the heat generating device 31 includes a plurality of heat generating elements 38, the heat reflecting portion 87 may be provided for each heat generating element 38, or may be provided along an inner surface of the container 37 so as to cover the plurality of heat generating elements 38. The heat generating element 38 is heated by the heat of the heater 39 and the heat reflected by the heat reflecting portion 87. As a result, the heat generating device 31 reduces the input power required to maintain a desired temperature.

In the heat generating device 101, the number of heat generating units 84 forming the heat generating module 80 and the number of heat generating structures 83 forming the heat generating unit 84 are not particularly limited. Further, the heat generating unit 84 is not limited to being formed in a cylindrical shape, and may be formed by a plurality of heat generating structures 83 disposed radially.

REFERENCE SIGNS LIST

1, 31, 61, 101 heat generating device
5, 38, 60, 81 heat generating element
6, 39, 82 heater
22, 51, 63 base
23, 65 first layer
24, 66 second layer

The invention claimed is:

1. A heat generating device comprising:
   a container into which a hydrogen-based gas contributing to heat generation is configured to be introduced;
   a heat generating element provided inside the container;
   a heater configured to heat the heat generating element; and
   a pump, wherein
   the heat generating element includes:
      a base made of a hydrogen storage metal, a hydrogen storage alloy, or a proton conductor; and
      a multilayer film provided on a surface of the base, the multilayer film having a stacking configuration of:
         a first layer that is made of a hydrogen storage metal or a hydrogen storage alloy and has a layer shape with a thickness of less than 1000 nm; and
         a second layer that is made of a hydrogen storage metal, a hydrogen storage alloy, or ceramics different from that of the first layer and has a layer shape with a thickness of less than 1000 nm, wherein
   the base has a porous structure or a mesh structure, and includes a hollow surrounded by an inner peripheral surface of the base, and
   the pump is configured to guide the hydrogen-based gas in the container into the hollow by allowing the hydrogen-based gas to permeate sequentially through the multilayer film and the base.

2. The heat generating device according to claim 1, wherein
   the first layer is made of any one of Ni, Pd, Cu, Cr, Fe, Mg, Co, and alloys thereof, and
   the second layer is made of any one of Ni, Pd, Cu, Cr, Fe, Mg, Co, alloys thereof, and SiC.

3. The heat generating device according to claim 1, wherein
   the multilayer film is configured such that the stacking configuration of the first layer and the second layer is repeatedly stacked.

4. The heat generating device according to claim 1, further comprising:
   a permeated-gas recovery path through which the hydrogen-based gas guided into the hollow by the pump is configured to return to the container again.

\* \* \* \* \*